US007275422B2

(12) United States Patent
Holi et al.

(10) Patent No.: US 7,275,422 B2
(45) Date of Patent: Oct. 2, 2007

(54) SYSTEM FOR ASSEMBLY OF A ROTATING MACHINE

(75) Inventors: Shuji Holi, Hyogo-ken (JP); Yukiko Takasugi, Hyogo-ken (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 19 days.

(21) Appl. No.: 11/386,709

(22) Filed: Mar. 23, 2006

(65) Prior Publication Data

US 2006/0217933 A1 Sep. 28, 2006

(30) Foreign Application Priority Data

Mar. 25, 2005 (JP) ............................. 2005-087807

(51) Int. Cl.
*G01M 1/00* (2006.01)
(52) U.S. Cl. ....................................................... 73/66
(58) Field of Classification Search ................. 73/168, 73/66
See application file for complete search history.

(56) References Cited

U.S. PATENT DOCUMENTS 4,248,095 A * 2/1981 Akatsu et al. ................ 73/771
4,897,635 A * 1/1990 Topping ...................... 340/681
2003/0160195 A1* 8/2003 Kosugi ..................... 250/559.29
2006/0033055 A1* 2/2006 Kosugi ......................... 250/548

FOREIGN PATENT DOCUMENTS

| JP | 06-055385 | 3/1994 |
| JP | 7-4207 | 1/1995 |
| JP | 10-332305 | 12/1998 |
| JP | 2003-206747 | 7/2003 |

* cited by examiner

*Primary Examiner*—Andre J. Allen
(74) *Attorney, Agent, or Firm*—Westerman, Hattori, Daniels & Adrian, LLP.

(57) ABSTRACT

In each work process of the assembly work of a large rotating machine, an input terminal unit 101 displays measuring points necessary for measurements of radial and axial clearances between a rotor and a casing so as to provide workers with instructions. When workers measure the clearances at the instructed measuring points, the measured values will be supplied to the input terminal unit 101 so as to confirm whether the measured values are within design tolerances or not. In addition, when workers measure the clearances at the instructed measuring points, amounts of adjustment of the casing will be displayed so that the measurement results at the measuring positions will have an optimum positional relation with the designed values.

11 Claims, 8 Drawing Sheets

FIG.7

|  | C1 | C2 | C3 | C4 | C5 | C6 | T1 | T2 | T3 | T4 |
|---|---|---|---|---|---|---|---|---|---|---|
| TOPSIDE |  | — | — | — | — |  |  | — | — |  |
| BOTTOM SIDE | — | — | — | — | — | — | — | — | — | — |
| RIHGT SIDE |  | — | — | — | — |  |  | — | — |  |
| LEFT SIDE |  | — | — | — | — |  |  | — | — |  |

| r0 | r1 | r2 | r3 | r4 | | rn |
|---|---|---|---|---|---|---|
|  | — | — | — | — | | — |

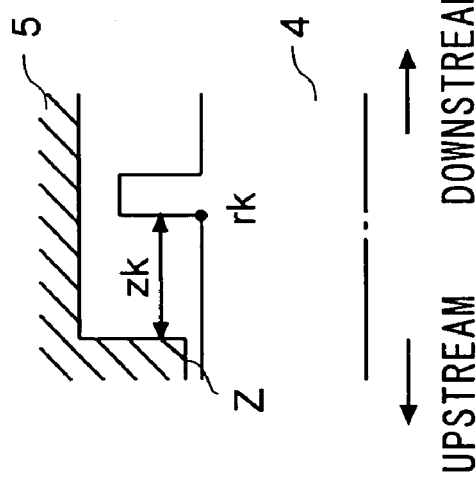
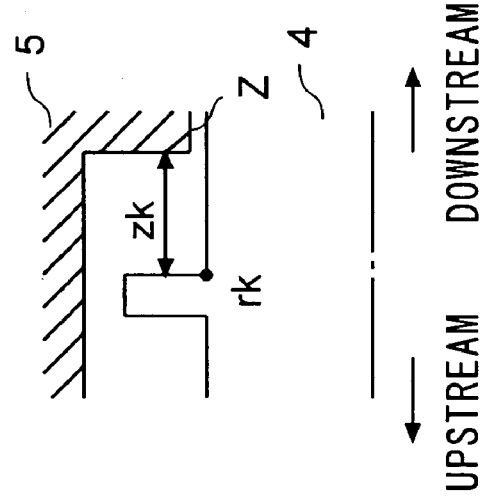
FIG.12A
FIG.12B

SYSTEM FOR ASSEMBLY OF A ROTATING MACHINE

The present invention is based on the Japanese Patent Application No. 2005-87807 filed on Mar. 25, 2005, the contents of which are hereby incorporated by reference.

BACKGROUND OF THE INVENTION

1. Field of the Invention

The present invention relates to a system for assembly of a rotating machine to perform data processing of measurements of each portion in an assembly work of a large rotating machine such as a gas turbine, a steam turbine and the like.

2. Description of the Prior Art

Generally, in order to assemble a large rotating machine such as a gas turbine, a steam turbine and the like, a lower half of each of an outer casing and an inner casing thereof is placed on a base stand being installed with a predetermined levelness. Then, after a rotor is installed to the lower half of the inner casing being placed, the upper half of the inner casing is assembled to the upper side of the lower half of the inner casing so as to cover the rotor, and subsequently, the upper half of the outer casing is assembled to the upper side of the lower half of the outer casing so as to cover the inner casing.

A large rotating machine being assembled as described hereinabove is so designed as to have smaller clearances between the rotor and the casing in order to enhance energy efficiency thereof. However, due to a decrease in the clearances, when each of the shaft centers of the casing serving as a stationary part and the rotor serving as a rotating part is slightly out of alignment, edges of the stationary vanes and rotating blades being installed to the casing and the rotor, respectively, come into contact with the casing and the rotor. In addition, when the casing and the rotor are axially misaligned, the casing including the stationary vanes and the rotor including the rotating blades come into contact with each other. As a result, due to the contacts as have been mentioned, there is a fear of breakage of a rotating machine when the rotating machine is rotated.

Therefore, when a large rotating machine being designed to decrease the clearances is assembled, it is necessary to measure the clearances between the casing and the rotor and adjust the positions thereof so as to make the measurement results stay within the allowable range of the designed values. When measurements are taken in order to confirm whether the clearance at each position being formed between a casing and a rotor is within the allowable range of the designed values or not, it is required that the measurements should be accurate. In order to make the clearances between the casing and the rotor appropriate, an assembly method of a steam turbine is disclosed, wherein measurement using wiring is performed to measure the positions of the stationary parts such as the casing and the like by having a piano wire being supposed as the shaft center of the rotor serve as the basis. (See the Japanese Patent Applications Laid-Open No. H6-55385 and No. H7-4207.)

In the assembly methods being disclosed in the Japanese Patent Applications Laid-Open as No. H6-55385 and No. H7-4207, after aligning the shaft center of each portion of the casing based on the measured values being obtained by the measurements using wiring, the casing and the rotor are assembled sequentially to complete assembly of a steam turbine. Moreover, in the assembly method being disclosed in the Japanese Patent Application Laid-Open as No. H6-55385, after the rotor is installed into the casing, the clearances between the inner casing and the rotor are obtained based on the results of measurements using a depth gauge, so as to make adjustments by moving the position of the inner casing.

A large rotating machine such as a steam turbine, a gas turbine and the like is assembled as described hereinabove. However, in each process of (1) when a rotor is assembled to the lower half of an inner casing, (2) when the upper half of the inner casing is assembled, (3) when the upper half of an outer casing is assembled, and (4) when all parts are assembled, deflection and distortion of the rotor and the casing occur based on the empty weight and rigidity thereof, which consequently changes the relative positions of the rotor and the casing. Therefore, it is necessary to confirm whether the clearances between the rotor and the casing are within an appropriate range or not.

In order to confirm whether or not the axial or radial clearances between the rotor and the casing are within the appropriate range, respectively, not only there are so many points to measure the clearances but also measurable points and non-measurable points are different in each work process. Therefore, conventionally, it is necessary for a worker to check each measurement part, and there is a potentiality that missing of measurement might occur. In addition, for non-measurable points, calculations for correction are done, using the measured values being obtained at the measurable points. However, because different workers do the calculations for correction for each point, activities thereof become cumbersome. Hereat, it is necessary to determine parameters for the calculations for correction, based on the empty weight and rigidity of the casing and the rotor of a large rotating machine to be assembled, which further makes activities of the calculations for correction cumbersome and complicated.

SUMMARY OF THE INVENTION

It is an object of the present invention to provide a system for assembly of a rotating machine which, in an assembly work of a large rotating machine, can specify measuring points to measure an amount of misalignment between a rotor and a casing and can record the measurement results being obtained at the specified measuring points as data. In addition, it is another object of the present invention to provide a system for assembly of a rotating machine which can automatically do calculations for correction of the measurement results being obtained at non-measurable points. Moreover, it is another object to provide a system for assembly of a rotating machine which can automatically calculate the measurement results of misalignment and the measurement results at the non-measurable points for correction, and at the same time, can indicate an optimum amount of adjustment based on the results of the calculations for correction.

In order to achieve the above-mentioned object, a system for assembly of a rotating machine in accordance with the present invention is a system for assembly of a rotating machine which supports activities to assemble a rotating machine being provided with a rotor being rotary driven and a casing covering and supporting the rotor and comprises an input terminal unit that for each work process in an assembly work of the rotating machine, instructs a first measuring point requiring measurement at the measuring points of the rotating machine, and at the same time, determines whether a measured value being input is within a permissible design range or not when the measured value at the first measuring point being instructed is input; and a database that records the measured values at the measuring points being input by the input terminal unit for each work process of the assembly work.

In such a system for assembly or a rotating machine as described hereinabove, a predicted value of measurement at a second measuring point of the measuring points of the rotating machine other than the first measuring point is estimated, based on a measured value at the first measuring point being obtained and input in the present work process of the assembly work and on measured values at the first and the second measuring points being obtained and input in a previous work process to the present process in the assembly work, and it is judged whether the predicted value of measurement at the second measuring point being estimated is within the permissible design range or not.

In addition, in the input terminal unit, an amount of adjustment is specified to adjust the position of the rotor or the casing, based on measured values or predicted values of measurement at the measuring points. Hereat, in the input terminal unit, the amount of adjustment of the position of the rotor or the casing may be specified, based on mean value of differences between individually at the measuring points measured values or predicted values of measurement and the designed values. In addition, the mean value of the differences between the measured values or the predicted values of measurement and the designed value may be obtained by weighting addition being provided with a weighting coefficient based on the positions of the measuring points. An amount of radial or axial adjustment of the rotor and the casing is obtained in the manner as described hereinabove.

Moreover, in each work process of an assembly work to install the upper half of the casing after installing the rotor to the lower half of the casing, radial and axial clearances between the rotor and the casing are measured at each of the measuring points being specified in the axial direction of the rotating machine, and among the measuring points being specified for the rotating machine, the input terminal unit may display and instruct a measuring point as the first measuring point, where radial or axial clearance between the rotor and the casing can be measured.

In accordance with the present invention, because measuring points necessary for each work process of an assembly work are instructed by an input terminal unit, a worker can confirm measuring points in each work process easily by referring to instructions of the input terminal unit. In addition, because the input terminal unit determines whether measured values and predicted values of measurement at each measuring point are within a permissible design range or not, a worker can confirm assembly positions easily that are out of the permissible design range by referring to information of the input terminal unit. Moreover, because measured values at the measuring points are recorded in the database for each work process, measured values in each work process during assembly can be easily confirmed by referring to the data being stored in the database after a rotating machine is completely assembled.

Furthermore, in the input terminal unit in accordance with the present invention, because a predicted value of measurement at a non-measurable second measuring point is obtained and an amount of adjustment is specified to adjust the position of a rotor or a casing based on measured values or predicted values of measurement at the measuring points, conventional calculation being performed by a worker become unnecessary, which eliminates cumbersome of an assembly work. Additionally, because weighting addition being provided with a weighting coefficient based on the positions of the measuring points is performed, more accurate and optimum amount of adjustment can be obtained.

DESCRIPTION OF THE DRAWINGS

FIG. 7 is a diagram showing a display example instructing measuring points in an input terminal unit.

FIG. 12A and FIG. 12B are diagrams explaining a method to specify the amount of axial adjustment of a casing of a gas turbine.

DESCRIPTION OF THE PREFERRED EMBODIMENTS

Figure 1:
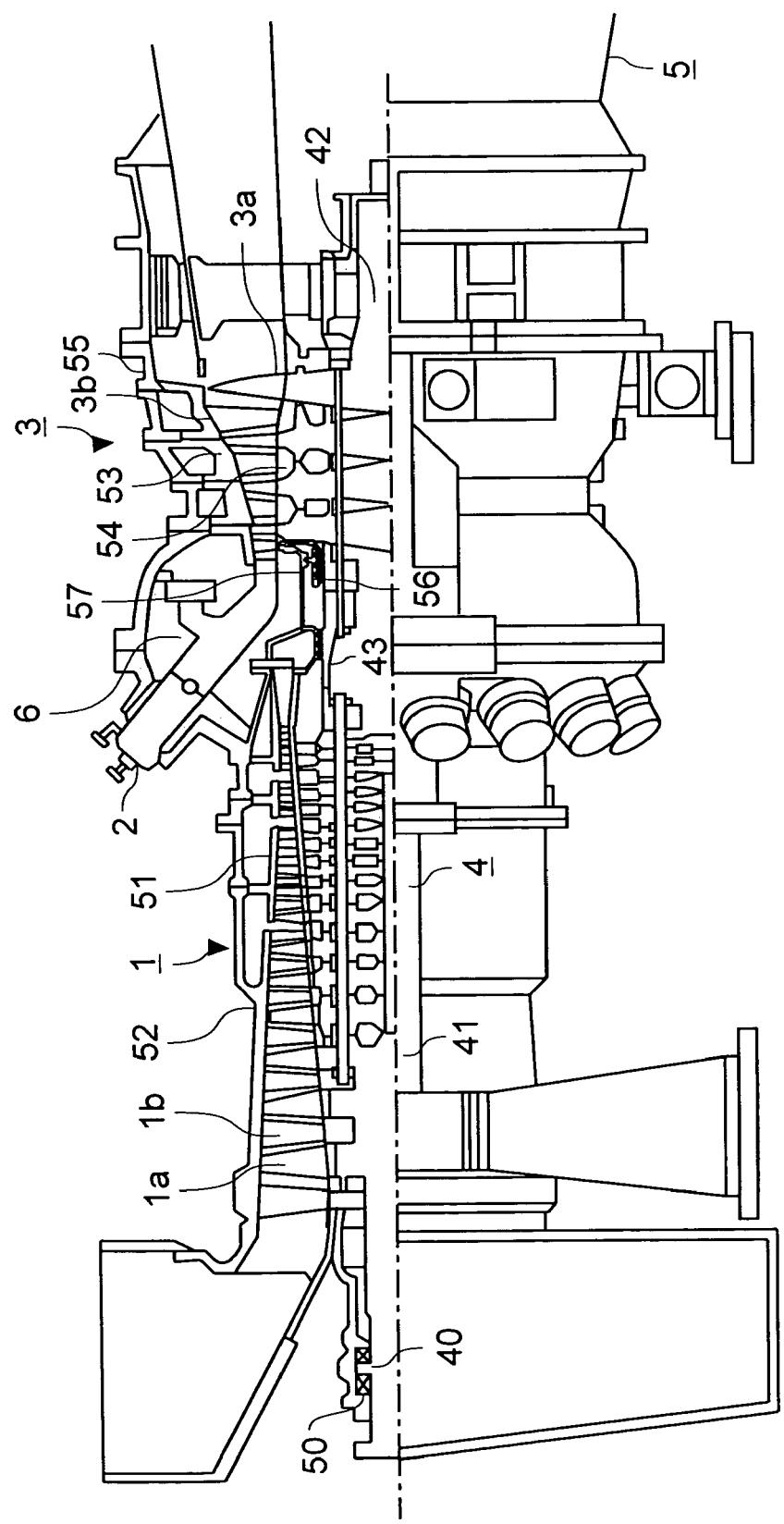
FIG. 1 is a schematic cross-sectional view along the axial direction of a rotor showing an outline construction of a gas turbine.

Referring now to the drawings, an embodiment of the present invention will be described hereinafter. The following embodiment will be explained with a gas turbine, representing a large rotating machine, but the same is applied to other large rotating machines such as a steam turbine and the like.

<Assembly Work>

Figure 2:
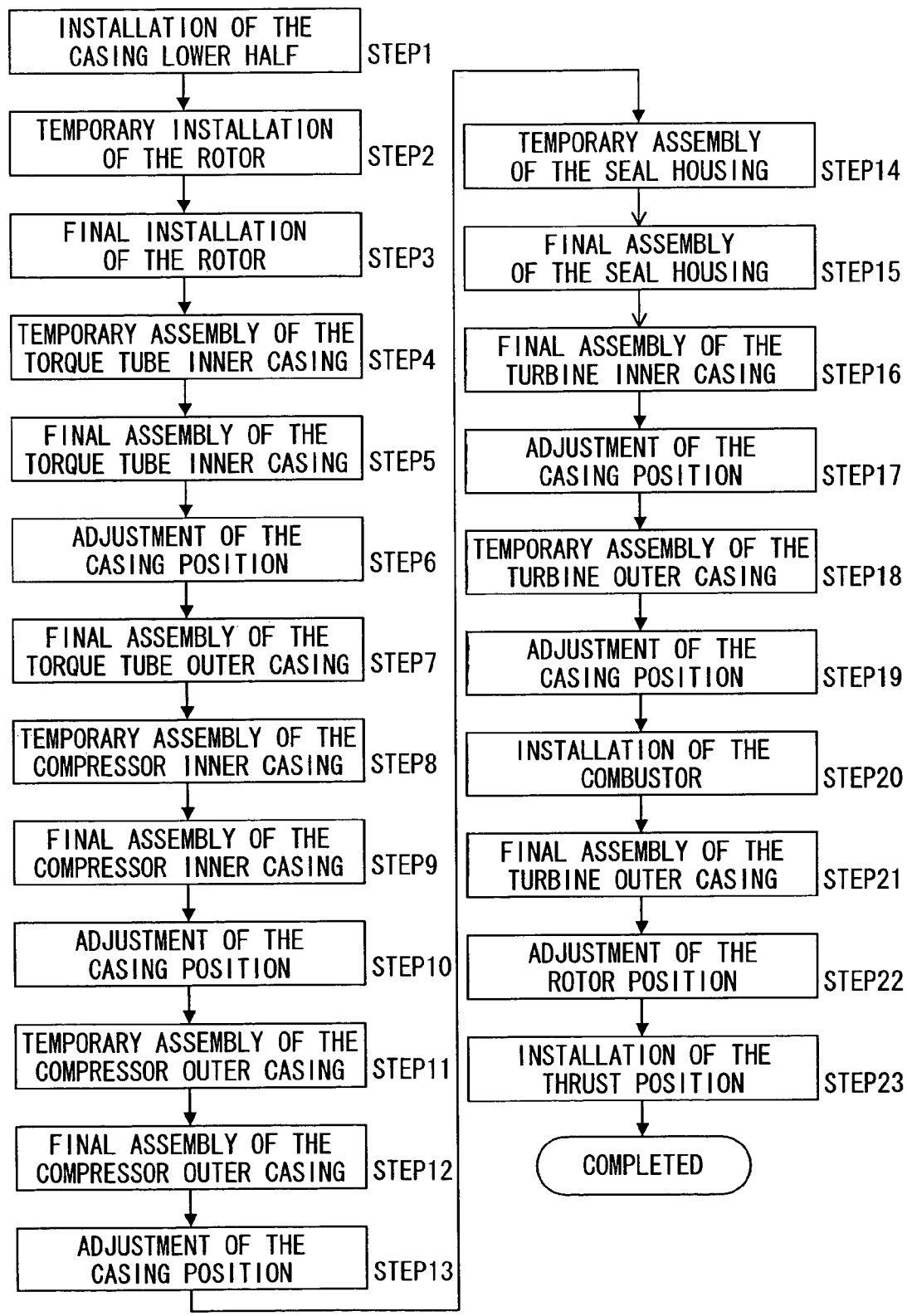
FIG. 2 is a flow chart showing an outline of assembly work of a gas turbine of FIG. 1.

First of all, an assembly work of a gas turbine will be simply explained by referring to the drawings. FIG. 1 is a schematic cross-sectional view along the axial direction of a rotor showing an outline construction of a gas turbine. In addition, FIG. 2 is a flow chart showing an outline of the assembly work of a gas turbine.

A gas turbine in FIG. 1 comprises a compressor 1 compressing air from the outside; a combustor 2 being supplied with the air compressed in the compressor 1 and performing combustion behavior with a fuel and the air being supplied; and a turbine 3 being rotary driven by combustion gas being generated by combustion behavior of the combustor 2. Then, the gas turbine comprises a rotor 4 having rotating blades 1*a* and 3*a* installed; and a casing 5 being provided with stationary vanes 1*b* and 3*b* that are installed in the axial direction of the rotor 4 alternately with each of the rotating blades 1*a* and 3*a*. Hereinafter, "upstream" and "downstream" will be referred to as being based on the direction of a flow of the air flowing through the compressor 1 and the direction of a flow of combustion gas flowing through the turbine 3.

The rotor 4 of the gas turbine comprises a thrust collar 40 being installed to an upstream end of the rotor 4; a rotor on the compressor side 41 (compressor rotor 41) having rotating blades 1*a* of the compressor 1 installed; a rotor on the turbine side 42 (turbine rotor 42) having rotating blades 3*a* of the turbine 3 installed; and a torque tube 43 connecting the compressor rotor 41 and the turbine rotor 42. In addition, the casing 5 comprises a thrust bearing 50 that prevents axial oscillation of the rotor 4 by axially sandwiching the thrust collar 40 of the rotor 4 from the upstream side and the downstream side; a compressor inner casing 51 that has stationary vanes 1*b* on the downstream side of the compressor 1 installed; a compressor outer casing 52 that has the stationary vanes 1*b* on the upstream side of the compressor 1 installed and forms a combustor room 6 into which the combustor 2 is inserted; a turbine inner casing 53 that has stationary vanes 3*b* of the turbine 3 installed; a seal housing 54 that is provided inside of the stationary vanes 3*b* being installed to the turbine inner casing 53 and covers the turbine rotor 42; a turbine outer casing 55 that is installed so as to cover the outside of the turbine inner casing 53; a torque tube inner casing 56 that covers the torque tube 43; and a torque tube outer casing 57 that covers the torque tube inner casing 56.

Here, the compressor inner casing 51 consists of a plurality of diaphragms being provided with stationary vanes 1*b* on the downstream side of the compressor 1, and at the same time, a part of the compressor outer casing 52 consists of a plurality of diaphragms being provided with the stationary vanes 1*b* on the upstream side of the compressor 1. Additionally, the turbine inner casing 53 consists of a plurality of blade rings being provided with stationary vanes 3*b* of the turbine 3. Moreover, the seal housing 54 consists of blade segments being installed between rotating blades 3*a* that are adjacent to each other in the axial direction of the turbine rotor 42.

Assembly work of such a gas turbine as described hereinabove will be explained hereafter. First, the lower half of each of the compressor inner casing 51, the compressor outer casing 52, the turbine inner casing 53, the turbine outer casing 55 and the torque tube inner casing 56 is installed, so that, the lower half of the casing 5 is installed. (STEP 1) At this time, the lower halves of the compressor inner casing 51 and the torque tube outer casing 57 are installed to the upper side of the lower half of the compressor outer casing 52 and the lower half of the torque tube inner casing 56 is installed to the upper side of the lower half of the torque tube outer casing 57. In this way, the lower half of the compressor outer casing 52 covers the lower halves of the compressor inner casing 51 and the torque tube outer casing 57, and the lower half of the torque tube outer casing 57 covers the lower half of the torque tube inner casing 56. Additionally, the lower half of the turbine inner casing 53 is installed to the upper side of the lower half of the turbine outer casing 55 so as to have the lower half of the turbine outer casing 55 cover the lower half of the turbine inner casing 53. Moreover, the lower half of the thrust bearing 50 is installed to an end of the compressor outer casing 52 being opposite to the torque tube inner casing 56. Furthermore, the lower half of the seal housing 54 is installed to the inside of the stationary vanes 3*b* being provided to the turbine inner casing 53.

Figure 3:
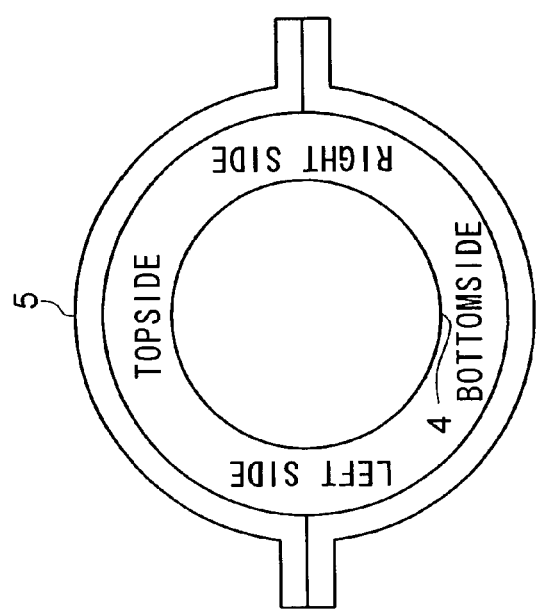
FIG. 3 is a schematic cross-sectional view along the radial direction of a rotor showing an outline construction of a gas turbine.

After that, when the rotor 4 having the compressor rotor 41 and the turbine rotor 42 connected by way of the torque tube 43 is lifted, the rotor 4 is temporarily assembled by installing the rotor 4 to the lower half of the casing 5 in condition of being lifted up. (STEP 2) At this time, a lead wire for measurement is provided to the bottommost point of the part serving as the bottom of the lower half of the casing 5 that is installed in STEP 1. Then, after dismantling the rotor 4, the lead wire for measurement is taken out to check for an amount of deformation, thereby measuring the clearance between the downside of the rotor 4 and the casing 5. In addition, in the present embodiment, measurement using a wiring is exemplified as one of measurement methods to measure the clearance at each measuring point during temporary assembly, but the clearances may be measured by using another measurement method. Moreover, as shown in a radial cross-sectional view being seen from the upstream side of the rotor 4 in FIG. 3, positions serving as the uppermost point (zero (0) o'clock position) and the bottommost point (six (6) o'clock position) are referred to as "topside" and "bottom side," respectively, and the three (3) o'clock position and the nine (9) o'clock positions of the rotor 4 in the horizontal direction are referred to as "right side" and "left side," respectively.

After confirming that the clearances with each of the compressor inner casing 51, the turbine inner casing 53 and the torque tube inner casing 56, being measured on the bottom side of the rotor 4 at a plurality of positions respectively, are within the permissible design range, the rotor 4 is finally assembled by installing the rotor 4 to the casing 5 having the lower half thereof placed. (STEP 3) At this time, with the rotor 4 being assembled, the clearances between the rotor 4 and the casing 5 on the left side and the right side are measured, thereby confirming the clearances with the casing 5. Specifically, clearances on each of the left side and the right side of the rotor 4, with each of the compressor inner casing 51, the turbine inner casing 53 and the torque tube inner casing 56 are measured at a plurality of positions, respectively, using a taper gauge and the like.

In addition, when the rotor 4 is finally assembled as described hereinabove, not only radial clearances of the rotor 4 but also axial position of the rotor 4 are measured. Specifically, relative position of the rotor 4 to the casing 5 at each axial location is measured, and thus, axial misalignment of the rotor 4 is confirmed. More specifically, axial clearances between the thrust collar 40 and the thrust bearing 50, clearances between the rotating blades 1*a* and the stationary vanes 1*b* being axially adjacent to each other in the compressor 1, clearances between the rotating blades 3*a* and stationary vanes 3*b* being axially adjacent to each other in the turbine 3, clearances at each position of the rotor 4 with sealing members being provided to the casing 5, relative relation between the rotor 4 and the casing 5 at each position, and the like are measured. Then, after specifying the end location of the rotor 4 (flange location) as a reference position, axial misalignment of the rotor 4 at each position is confirmed by measuring the relative position between the reference position and the casing 5 in each of the following work processes.

Then, after the rotor 4 is finally assembled, the torque tube inner casing 56 is temporarily assembled by installing the upper half of the torque tube inner casing 56 so as to cover the upper part of the torque tube 43 of the rotor 4. (STEP 4) At this time, in the torque tube inner casing 56, a lead wire for measurement is installed to a part being opposite to the topside of the rotor 4. Then, after dismantling the torque tube inner casing 56, the lead wire for measurement is taken out to check for an amount of deformation, thereby measuring the clearance between the topside of the rotor 4 and the toque tube inner casing 56.

Subsequently, after confirming that the clearances at a plurality of positions between the topside of the torque tube 43 of the rotor 4 and the torque tube inner casing 56 are within a permissible design range, the torque tube inner casing 56 is finally assembled by installing the upper half of the torque tube inner casing 56 to the lower half of the torque tube inner casing 56. (STEP 5) At this time, by using a taper gauge, clearances on each of the topside, the left side and the right side of the torque tube 43 with the torque tube inner casing 56 are measured at a plurality of locations, respectively, as well as axial misalignment of the rotor 4 with the reference position is measured. Then, in accordance with the clearances with the torque tube inner casing 56 being measured at a plurality of locations, the position of each portion of the casing 5 is adjusted. (STEP 6) Subsequently, the torque tube outer casing 57 is finally assembled by installing the upper half of the torque tube outer casing 57 to the lower half of the toque tube outer casing 57 so as to cover the torque tube inner casing 56. (STEP 7)

Next, after completing assembly of the torque tube outer casing 57, by having the upper half of the compressor inner casing 51 installed so as to cover the downstream upper side of the compressor rotor 41, the compressor inner casing 51 is temporarily assembled. (STEP 8) At this time, same as STEP 4, a lead wire for measurement is installed to a part being opposite to the topside of the rotor 4 in the compressor inner casing 51 to measure the clearance between the topside of the rotor 4 and the compressor inner casing 51. After that, same as STEP 5, by having the upper half of the compressor inner casing 51 installed to the lower half of the compressor inner casing 51, the compressor inner casing 51 is finally assembled. (STEP 9)

In performing final assembly of STEP 9, a measurable clearance between the compressor rotor 41 and the compressor inner casing 51 and an axial misalignment of the rotor 4 with the reference position are measured with a taper gauge and an inside micrometer. Specifically, when the compressor inner casing 51 consists of a plurality of inner casing segments, clearances on each of the topside, the left side and the right side of the compressor rotor 41 with a plurality of positions of the compressor inner casing 51 are measured at the measuring locations on the axial end surface of each inner casing segment; and also, clearances on each of the topside, the bottom side, the left and the right of the compressor rotor 41 with the compressor inner casing 51 are measured at the measuring locations on the boundary between the compressor inner casing 51 and the torque tube outer casing 57. Then, same as STEP 6, the position of each portion of the casing 5 is adjusted in accordance with the measured values. (STEP 10)

When each of the compressor inner casing 51 and the torque tube outer casing 57 is assembled in such a manner as described hereinabove, the compressor outer casing 52 is temporarily assembled by having the upper half of the compressor outer casing 52 installed so as to cover the upper sides of the compressor inner casing 51 and the torque tube outer casing 57 and the upstream upper side of the compressor rotor 41. (STEP 11) In temporary assembly of the compressor outer casing 52, same as STEP 8, clearances at a part being opposite to the upstream topside of the compressor rotor 41 in the compressor outer casing 52 is measured with a lead wire for measurement.

Then, by confirming that the clearances between the compressor outer casing 52 and the compressor rotor 41 are within a permissible design range and installing the upper half of the compressor outer casing 52 to the lower half of the compressor outer casing 52, the compressor outer casing 52 is finally assembled. (STEP 12) At this time, by using a taper gauge, clearances on each of the topside, the bottom side, the right side and the left side of the compressor rotor 41 with the compressor inner casing 51 and the compressor outer casing 52 are measured, respectively. Subsequently, same as STEP 10, the position of each portion of the casing 5 is adjusted in accordance with the measured values. (STEP 13)

After the compressor 1 and the combustor chamber 6 are formed by having the compressor outer casing 52 assembled, next, a seal housing 54 is temporarily assembled by having the seal housing 54 installed so as to cover the part of the turbine rotor 42 where no rotating blades 3*a* are installed. (STEP 14) In the temporary assembly of the seal housing 54, same as STEP 8, clearances of the part being opposite to the topside of the turbine rotor 42 in the seal housing 54 are measured with a lead wire for measurement. Then, by installing the upper half of the seal housing 54 to the lower half of the seal housing 54, the seal housing 54 is finally assembled. (STEP 15)

Furthermore, for the turbine rotor 42 having the seal housing 54 installed thereto, the upper half of the turbine inner casing 53 is installed to the lower half of the turbine inner casing 53, thereby performing final assembly of the turbine inner casing 53. (STEP 16) At this time, in the measuring locations being positioned at the most upstream and the most downstream of the turbine rotor 42, clearances on each of the topside, the bottom side, the right side and the left side of the turbine rotor 42 with the turbine inner casing 53 are measured at a plurality of positions, and in the measuring locations being positioned between the most upstream and the most downstream of the turbine rotor 42, clearances on each of the topside, the right side and the left side of the turbine rotor 42 with the turbine inner casing 53 are measured at a plurality of positions. In addition, the axial misalignment with the reference position of the rotor 4 is measured with an inside micrometer. After that, same as STEP 10, the position of each portion of the casing 5 is adjusted in accordance with the measured values. (STEP 17)

Then, after the turbine inner casing 53 is assembled, the turbine outer casing 55 is temporarily assembled by installing the upper half of the turbine outer casing 55 so as to cover the turbine inner casing 53. (STEP 18) When the turbine outer casing 55 is temporarily assembled, the clearances between the compressor rotor 41 and the compressor inner casing 51/the compressor outer casing 52 and the clearances between the turbine rotor 42 and the turbine inner casing 53 are measured with a taper gauge. Subsequently, the position of each portion of the casing 5 is adjusted in accordance with the measured values. (STEP 19) After these measurements, the turbine outer casing 55 is dismantled, and the combustor 2 is installed by inserting the compressor 2 into the combustor chamber 6 being formed by the compressor outer casing 52. (STEP 20)

When the combustor 2 is installed to the compressor outer casing 52 in such a manner as described hereinabove, the turbine outer casing 55 is finally assembled by installing the upper half of the turbine outer casing 55 to the lower half of the turbine outer casing 55. (STEP 21) At this time, clearances on each of the topside, the bottom side, the right side and the left side of the compressor rotor 41 with the compressor outer casing 52 and the clearances on each of the topside, the bottom side, the right side and the left side of the turbine rotor 42 with the turbine inner casing 53 are measured with a taper gauge, respectively, and also, the axial position of the rotor 4 is measured. Then, after the position of the rotor 4 is adjusted in accordance with the measured values (STEP 22) and subsequently, it is confirmed that the measured values are within a permissible design range, then, the thrust bearing 50 is installed so as to sandwich the upstream side and the downstream side of the thrust collar 40. (STEP 23) When the thrust bearing 50 is installed, the assembly work is completed.

<System for Assembly of a Rotating Machine>

Figure 4:
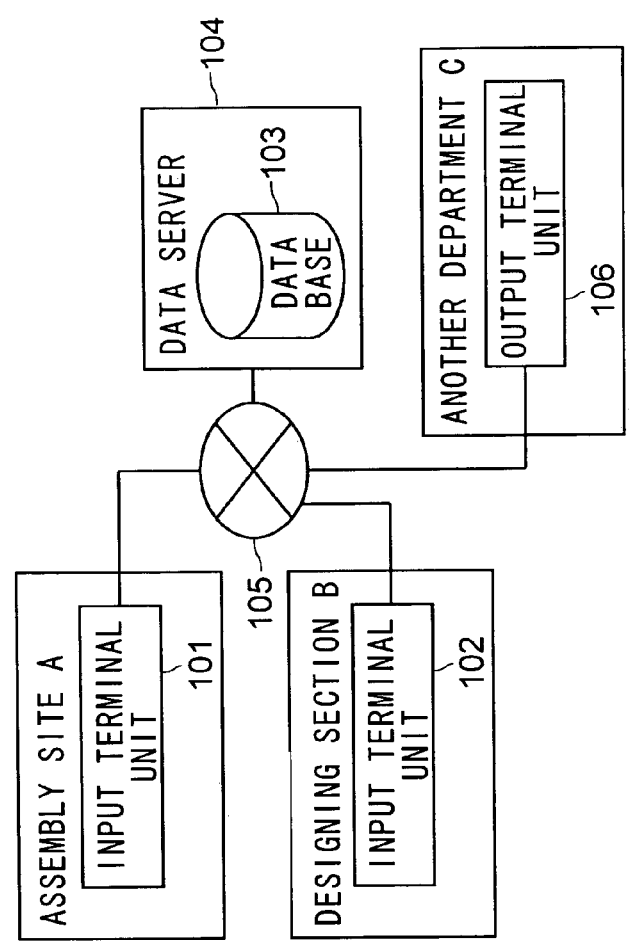
FIG. 4 is a block diagram showing a construction of a system for assembly of a rotating machine in accordance with an embodiment of the present invention.

A system to be used for assembly of a rotating machine in performing the assembly work of a gas turbine which is to be assembled in the aforementioned procedure will be described hereinafter by referring to the drawings. FIG. 4 is a block diagram showing a construction of a system for assembly of a rotating machine in accordance with the present embodiment.

The system for assembly of a rotating machine in FIG. 4 comprises an input terminal unit 101 in which data are entered by a worker at an assembly site "A"; an input terminal unit 102 in which data are entered by a designer in a designing section "B"; an output terminal unit 106 by which a third party in another department "C" can only browse the data; a data server 104 controlling a database 103 storing the data being entered by the input terminal units 101 and 102; and a network 105 linking the input terminal units 101 and 102, the output terminal unit 106 and the data server 104 by telecommunication.

In a system for assembly of a rotating machine being constructed in such a manner as described hereinabove, first, a designer enters design values and tolerances thereof at each part of a gas turbine, by using an input terminal unit 102, and then a worker enters the measured values being obtained by a worker in each work process of an assembly work by using an input terminal unit 101. Then, each of the data being entered by using the input terminal units 101 and 102 is transmitted to the data server 104 through the network 105 consisting of Local Area Network (LAN) being linked by wireless or wired connections, Internet and the like. Additionally, when the data inside the database 103 being controlled by the data server 104 are required by a designer or a worker, the data being stored in the database 103 are transmitted to the input terminal units 101 and 102 and the output terminal unit 106 from the data server 104 by way of the network 105.

Moreover, the input terminal unit 101 is provided with an application to (1) specify measurement items in each work process of an assembly work, (2) compensate data at non-measurable locations on the basis of the measured values that are entered, and (3) specify an amount of adjustment on the basis of comparison of the measured values of each portion of a gas turbine with the designed values. Furthermore, when the data server 104 is required to browse the measured values and the designed values in each work process of the assembly work being compiled in the database 103, by having a third party of another department "C" operate the output terminal unit 106, first, the data server 104 retrieves from the database 103 the measured values and the designed values in a work process of the assembly work of a rotating machine that are required. Then, by transmitting the measured values and the designed values being retrieved from the database 103 to the output terminal unit 106, a third party of another department "C" can browse the measured values and the designed values in each work process of the assembly work of a rotating machine being required through the output terminal unit 106. The behaviors of a system for assembly of a rotating machine during the assembly work based on the application being provided to the input terminal unit 101 will be described in details hereinafter.

(Specification of Measurement Items)

Figure 5:
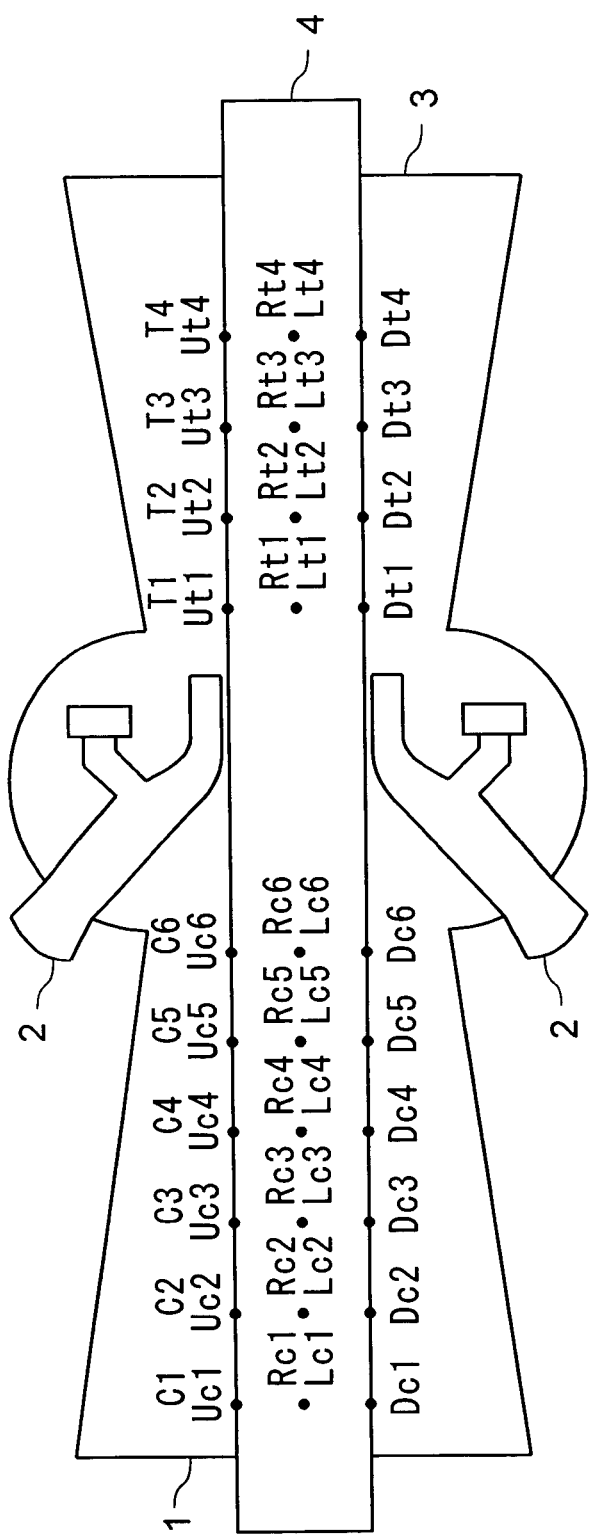
FIG. 5 is a schematic diagram of a gas turbine construction showing an example of locations of measuring points to measure radial clearances between a rotor and casing of a gas turbine.

According to the application being provided to the input terminal unit 101, locations requiring measurement for a gas turbine being subject to assembly at present are shown to a worker in each work process of the assembly work. Now, as shown in FIG. 5, the rotating blades 1a and the stationary vanes 1b being axially adjacent to each other compose one row, and a compressor 1 consists of six rows from "C1" through "C6," wherein, the measuring points on each of the topside, the bottom side, the right side and the left side in each of the rows "C1" through "C6" are "Uc1" through "Uc6," "Dc1" through "Dc6," "Rc1" through "Rc6" and "Lc1" through "Lc6," respectively. Wherein, the rows "C1" thorough "C3" are covered by the compressor outer casing 52, serving as the upstream side; and the rows "C4" through "C6" are covered by the compressor inner casing 51 consisting of one blade segment, serving as the downstream side. In addition, hereinafter, in order to simplify the description, the compressor inner casing 51 consists of one ring segment, but may consist of a plurality of ring segments.

Figure 6:
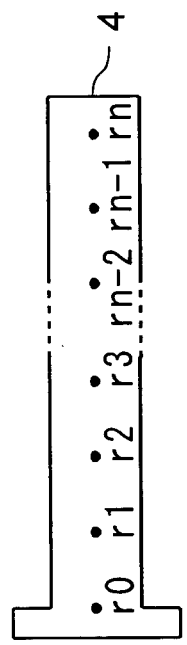
FIG. 6 is a schematic diagram of a rotor construction showing an example of locations of measuring points to measure axial misalignment of a rotor of a gas turbine.

Moreover, similarly, as shown in FIG. 5, the rotating blades 3a and the stationary vanes 3b being axially adjacent to each other compose one row, and the turbine 3 consists of four rows "T1" through "T4;" wherein, the measuring points on each of the topside, the bottom side, the right side and the left side in the rows "T1" through "T4" are "Ut1" through "Ut4," "Dt1" through "Dt4," "Rt1" through "Rt4" and "Lt1" through "Lt4," respectively. Furthermore, as shown in FIG. 6, the end location where a coupling is installed serves as a reference position "r0" for the rotor 4, and "n" pieces of measuring points being axially apart from the reference position "r0" are "r1" through "rn" in order. In addition, although not being illustrated, the measuring points "r1" through "rn" are specified on the end surfaces on both sides of the rotating blades 1a and 3a being provided to the compressor rotor 41 and the turbine rotor 42, respectively, on the end surfaces on both sides of the thrust collar 40, on the locations of sealing members being provided to the casing 5, and the like.

In consequence, when the rotor 4 is finally assembled in STEP 3, it is instructed to measure the clearances on the left and the right sides of the rotor 4 with the casing 5 in each of the rows "C1" through "C6" of the compressor 1 and the rows "T1" through "T4" of the turbine 3, respectively, and also it is instructed to measure the axial misalignment at the measuring points "r0" through "rn" of the rotor 4. Specifically, the measuring points "Rc1" through "Rc6," "Lc1" through "Lc6," "Rt1" through "Rt4," "Lt1" through "Lt4," and "r0" through "rn" are displayed in the input terminal unit 101 as being able to be entered, which urges the worker to take measurements at each measuring point by using a taper gauge. Additionally, at this time, because the measuring points "Uc1" through "Uc6," "Dc1" through "Dc6," "Ut1" through "Ut4" and "Dt1" through "Dt4" are not measurable, the measuring points "Uc1" through "Uc6," "Dc1" through "Dc6," "Ut1" through "Ut4" and "Dt1" through "Dt4" are displayed in the input terminal unit 101 as being unable to be entered.

Moreover, in STEP 8, when the compressor inner casing 51 composing the rows "C4" through "C6" of the compressor 1 is temporarily assembled, it is instructed to measure the clearances between the topside of the compressor rotor 41 and the compressor inner casing 51 in the rows "C4" through "C6" by using a lead wire for measurement. Specifically, the measuring points "Uc4" through "Uc6" are displayed in the input terminal unit 101 as being able to be entered, which urges the worker to take measurements at each measuring point. In addition, because measurement is unnecessary for other measuring points than the measuring points "Uc4" through "Uc6," the measuring points other than the measuring points "Uc4" through "Uc6" are displayed in the input terminal unit 101 as being unable to be entered.

Then, when the compressor inner casing 51 is finally assembled in STEP 9, it is possible to measure the clearance between the bottom side of the compressor rotor 41 and the compressor inner casing 51 in the row "C6," the clearances between the topside, the right side and the left side of the compressor rotor 41 and the compressor inner casing 51 in the rows "C4" and "C6," and the axial reference position of the rotor 4. Therefore, by display of the input terminal unit 101, measurements at the measuring points "Uc4," "Lc4," "Rc4," "Uc6," "Dc6," "Lc6," "Rc6" and "r0" are instructed. Additionally, in a similar manner, by the display of the input terminal unit 101, measurements at the measuring points "Uc1" through "Uc3" are instructed, respectively, when the compressor outer casing 52 is temporarily assembled in STEP 11; and measurements at the measuring points "Uc1," "Dc1," "Rc1," "Lc1," "Uc6," "Dc6," "Rc6," "Lc6" and "r0" are instructed, respectively, when the compressor outer casing 52 is finally assembled in STEP 12; and then, the compressor 1 is assembled.

In addition, in STEP 14, when the seal housing 54 composing each of the rows "T1" through "T4" of the turbine 3 is temporarily assembled, it is instructed to measure the clearances between the topside of the turbine rotor 42 and the seal housing 54 in each of the rows "T1" through "T4" by using a lead wire for measurement. Specifically, the measuring points "Ut1" through "Ut4" are displayed in the input terminal unit 10 as being able to be entered, which urges the worker to take measurements at each measuring point. Moreover, because measurement is unnecessary for other measuring points than "Ut1" through "Ut4," the measuring points other than "Ut1" through "Ut4" are displayed in the input terminal unit 101 as being unable to be entered.

Furthermore, in a similar manner, by display of the input terminal unit 101, measurements at the measuring points "Ut1" through "Ut4," "Dt1," "Dt4," Lt1" through "Lt4," "Rt1" through "Rt4" and "r0" are instructed, respectively, when the turbine inner casing 53 is finally assembled in STEP 16; measurements at the measuring points "Uc1," "Dc1," "Rc1," "Lc1," "Uc6," "Dc6," "Rc6," "Lc6," "Ut1," "Dt1," "Rt1," "Lt1," "Ut4," "Dt4," "Rt4 " and "Lt4" are instructed, respectively, when the turbine outer casing 55 is temporarily assembled in STEP 18; and measurements at the measuring points "Uc1," "Dc1," "Rc1," "Lc1," "Ut4," "Dt4," "Rt4," "Lt4" and "r0" are instructed, respectively, when the turbine outer casing 55 is finally assembled in STEP 21; and then the compressor 1 and the turbine 3 are assembled.

As shown in FIG. 7, for example, a display to instruct the measuring points to a worker by the input terminal unit 101 may be indicated with a table showing the topside, the bottom side, the right side and the left side in each of the rows "C1" through "C6" of the compressor rotor 41 and in each of the rows "T1" through "T4" of the turbine rotor 42 and a table showing the measuring points "r0" through "rn" of the rotor 4. Here, as shown in FIG. 7, by having cells showing the measuring points requiring measurements left blank and having cells showing the measuring points requiring no measurements indicated with a short dash (-), a worker may be informed of the measuring points requiring measurements. In addition, a worker may be informed of the measuring points requiring measurements, by using a different display method such as using different colors to distinguish the measuring points requiring measurements from the measuring points requiring no measurements, and the like.

When the worker confirms measuring points at which the input terminal unit 101 instructs to take measurements, the worker takes measurements at the measuring points being confirmed and enters the measured values at the instructed measuring points by operating the input terminal unit 101. The input terminal unit 101 temporarily stores the measured values being entered in a recording medium such as a hard disc or a memory. Then, the input terminal unit 101 estimates the measured values at the after-mentioned measuring points where no measurements are taken as the predicted values of measurement, based on the measured values at the measuring points that are entered.

Each of the measured values and predicted values of measurement at each measuring point is determined whether to be within a permissible design range or not that the designer has entered through the input terminal unit 102. Here, by having the input terminal unit 101 inform a worker of the measured values and predicted values of measurement within the permissible design range by displaying each of the measured values and predicted values of measurement within and out of the permissible design range in different manners, the worker can confirm the measuring points that are out of the permissible design range. Additionally, the measured value and the predicted value of measurement at each measuring point are supplied to the data server 104 through the network 105 and stored in the database 103 as data of the work process in which measurements are taken. Specifically, the measured value and the predicted value of measurement at each measuring point being obtained in each work process are stored in the database 103 together with the date and the assembly process when the measurements are taken, so that the measured value and the predicted value of measurement at each measuring point being obtained in each work process are stored as identifiable for each gas turbine and each work process.

(Correction of Data of Radial Measurements)

As mentioned hereinabove, when the measured values being obtained by a worker are supplied to the input terminal unit 101, the values at the non-measurable measuring points are obtained as predicted values of measurement by correcting the data based on the measured values that are entered. At this time, the predicted values of measurement at the non-measurable measuring points in the present work process are obtained by correcting, as correction of data of radial measurements of the rotor 4, the data based on the relation between the measured value and predicted value of measurement at each measuring point in the previous work process and the measured value in the present work process.

Figure 8A:
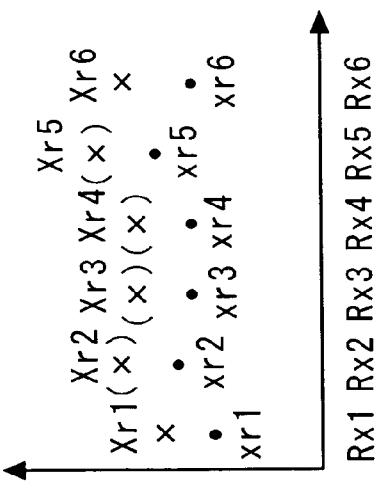
FIG. 8A is graphs showing an example of clearances between a casing and a rotor on the topside thereof.
Figure 8B:
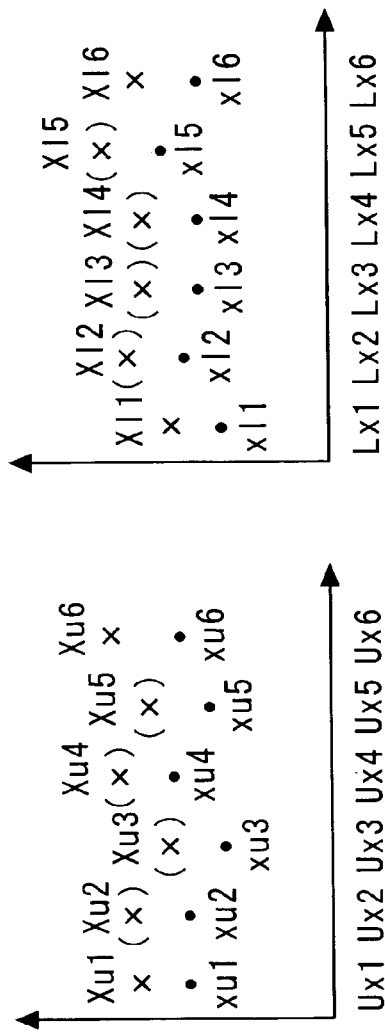
FIG. 8B is graphs showing an example of clearances between a casing and a rotor on the left side thereof.
Figure 8C:
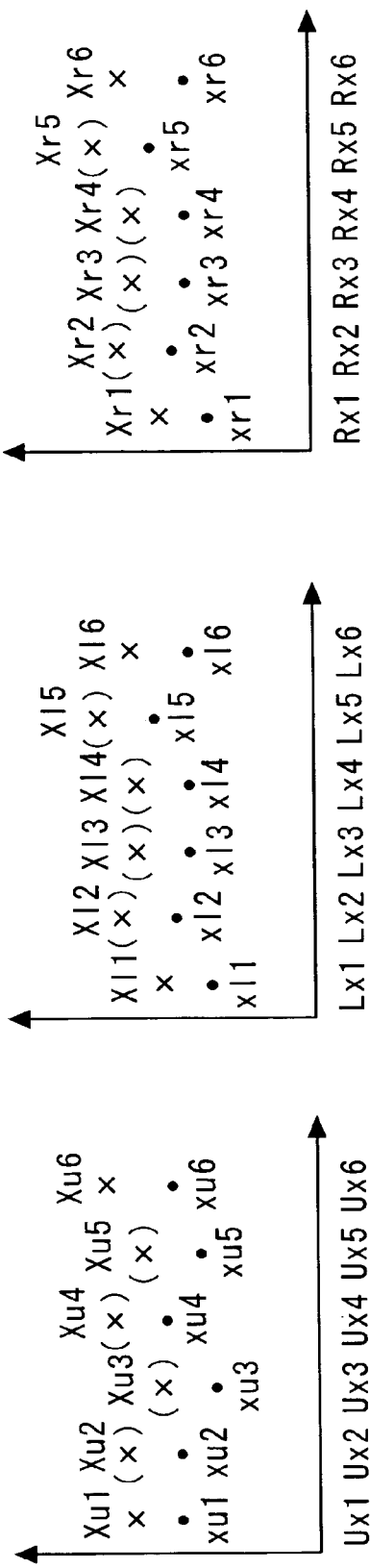
FIG. 8C is graphs showing an example of clearances between a casing and a rotor on the right side thereof.

Now, for example, the measuring locations of the rotor 4 are six points "x1" through "x6," and the clearances with the casing 5 at the topside measuring points "Ux1" through "Ux6," the left-side measuring points "Lx1" through "Lx6" and the right-side measuring points "Rx1" through "Rx6" in the measuring locations "x1" through "x6" are as shown with dots as in FIG. 8A to FIG. 8C. Additionally, the clearances with the inner casing 5 being obtained in the present work process at the topside measuring "Ux1" and "Ux6," the left-side measuring points "Lx1" and "Lx" and the right-side measuring points "Rx1" and "Rx6" are as shown with a mark "x" as in FIG. 8A to FIG. 8C. FIG. 8A to FIG. 8C is a graph showing the clearances with the casing 5 on each of the topside, the left side and the right side of the rotor 4.

Specifically, the measured values or the predicted values of measurement at the measuring points "Ux1" through "Ux6," "Lx1" through "Lx6" and "Rx1" through "Rx6" in the previous work process are "xu1" through "xu6," "xl1" through "xl6" and "xr1" through "xr6," respectively, and the measured values or the predicted values of measurement at the measuring points "Ux1," "Ux6," "Lx1," "Lx6," "Rx1" and "Rx6" in the present work process are "Xu1," "Xu6," "Xl1," "Xl6," "Xr1" and "Xr6," respectively.

Figure 9A:
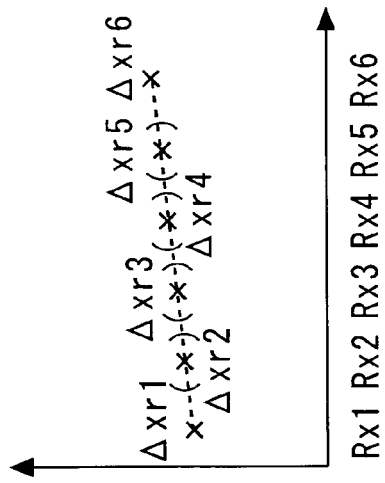
FIG. 9A is graphs showing an example of a change in the clearances between a casing and a rotor on the topside thereof.
Figure 9B:
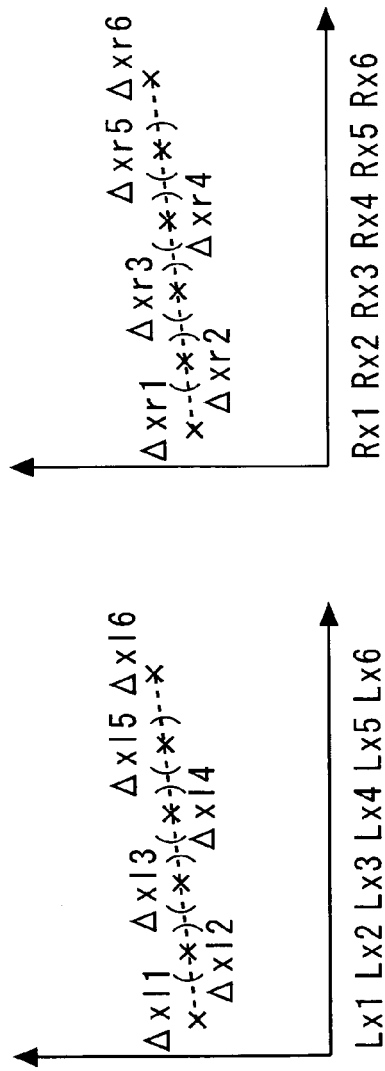
FIG. 9B is graphs showing an example of a change in the clearances between a casing and a rotor on the left side thereof.
Figure 9C:
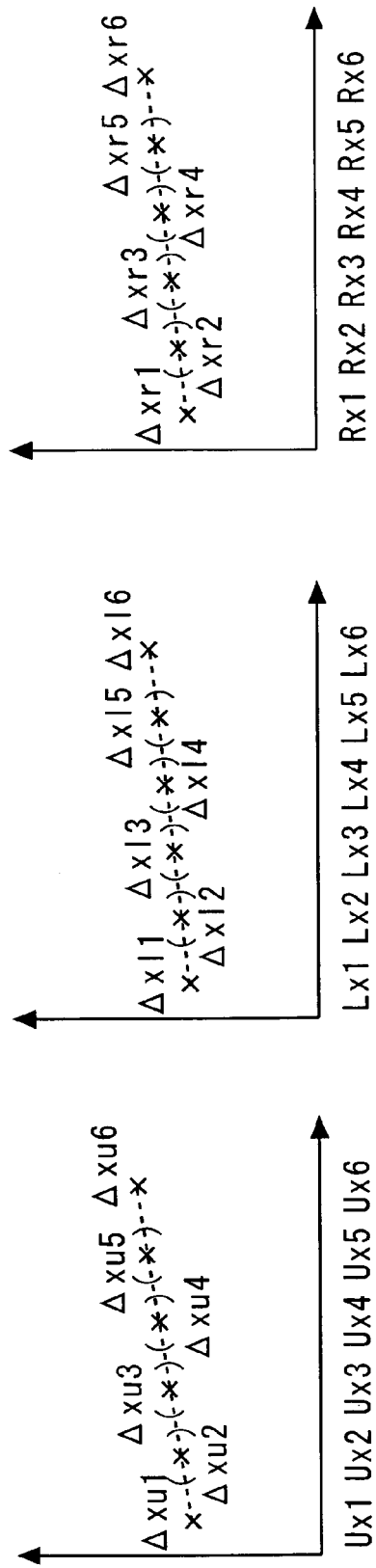
FIG. 9C is graphs showing an example of a change in the clearances between a casing and a rotor on the right side thereof.

First, at each of the measuring points "Ux1," "Ux6," "Lx1," "Lx6," "Rx1" and "Rx6" where the measured values are obtained in the present work process, the differences "Δxu1 (=Xu1−xu1)," "Δxu6 (=Xu6−xu6)," "ΔXl1 (=Xl1−xl1)," "ΔXl6 (=Xl6−xl6)," "Δxr1 (=Xr1−xr1)" and "Δxr6 (Xr6−xr6)" between the measured values and predicted values of measurement being obtained in the previous work process and the measured values and predicted values of measurement being obtained in the present work process are obtained as amounts of change. The amounts of change of the measured values "Δxu1," "Δxu6," "Δxl1," "ΔXl6," "Δxr1" and "Δxr6" at the measuring points "Ux1," "Ux6," "Lx1," "Lx6," "Rx1" and "Rx6," respectively, are as shown with a mark "x" in FIG. 9A to FIG. 9C. FIG. 9A to FIG. 9C is a graph showing amounts of change in clearance with the casing 5 on each of the topside, the left side and the right side of the rotor 4.

Then, the amounts of change "Δxu2" through "Δxu5" at the measuring points "Ux2" through "Ux5," respectively are obtained on the basis of the amounts of change "Δxu1" and "Δxu6" of the measured values at the measuring points "Ux1" and "Ux6," respectively, and the distances between each of the measuring locations "x2" through "x5" of the rotor 4 and the measuring points "x1" and "x6," respectively. Here, for example, the amounts of change of the measured values "Δxu2" through "Δxu5" may be obtained by linear interpolation based on the distances between each of the measuring locations "x2" through "x5" of the rotor 4 and the measuring points "x1" and "x6," respectively, and on the amounts of change "Δxu1" and "Δxu6" of the measured values.

Specifically, as shown in FIG. 9A to FIG. 9C, the points corresponding to the measuring locations "x2" through "x5" of the rotor 4 are confirmed, respectively, on the line connecting the amounts of change "Δxu1" and "Δxu6" of the measured values at the measuring points "Ux1" and "Ux6," respectively. Then, the values at the points corresponding to each of the measuring locations "x2" through "x5" that are confirmed on the line connecting the amounts of change "Δxu1" and "Δxu6" of the measured values at the measuring points "Ux1" and "Ux6," respectively, in FIG. 9A are the amounts of change "Δxu2" through "Δxu5" of the measured values. Here, the amounts of change "Δxu2" through "Δxu5" of the measured values being obtained at the measuring points "Ux2" through "Ux5" are indicated with a mark "x" as in FIG. 9A.

In addition, in a similar manner, the amounts of change "Δxl2" through "Δxl5" of the measured values at each of the measuring points "Lx2" through "Lx5" are obtained from the amounts of change "Δxl1" and "Δxl6" of the measured values at each of the measuring points "Lx1" and "Lx6;" and the amounts of change "Δxr2" through "Δxr5" at each of the measuring points "Rx2" through "Rx5" are obtained by the amounts of change "Δxr1" and "Δxr6" at the measuring points "Rx1" and "Rx6," respectively.

At this time, for example, as shown in FIG. 9B and FIG. 9C, when an amount of change is obtained by linear correction, the amounts of change "Δx12" through "Δx15" of the measured values at the measuring points "Lx2" through "Lx5" are obtained by a line connecting the amounts of change "Δxl1" and "Δx16" of the measured values at the measuring points "Lx1" and "Lx6," respectively; and the amounts of change "Δxr2" through "Δxr5" of the measured values at the measuring points "Rx2" through "Rx5" are obtained by a line connecting the amounts of change "Δxr1" and "Δxr6" of the measured values at the measuring points "Rx1" and "Rx6," respectively. Specifically, the amounts of change "Δx12" through "Δx15" and "Δxr2" through "Δxr5" of the measured values being obtained at the measuring points "Lx2" through "Lx5" and "Rx2" through "Rx5" are indicated with a mark "x" as in FIG. 9B and FIG. 9C.

As mentioned hereinabove, when the amounts of change "Δxu2" through "Δxu5," "Δx12" through "Δx15" and "Δxr2" through "Δxr5" of the measured values at each of the measuring points "Ux2" through "Ux5," "Lx2" through "Lx5" and "Rx2" through "Rx5" are obtained, the amounts of change "Δxu2" through "Δxu5," "Δx12" through "Δx15" and "Δxr2" through "Δxr5" of the measured values at each of the measuring points "Ux2" through "Ux5," "Lx2" through "Lx5" and "Rx2" through "Rx5" are added to the measured values or predicted values of measurement "xu2" through "xu5," "xl2" through "xl5" and "xr2" through "xr5" at the measuring points "Ux2" through "Ux5," "Lx2" through "Lx5" and "Rx2" through "Rx5" in the previous work process. Therefore, each of the predicted values of measurement "Xu2" through "Xu5" at the measuring points "Ux2" through "Ux5" in the present work process is obtained, respectively, by adding each of the amounts of change "Δxu2" through "Δxu5" of the measured values to each of the measured values or predicted values of measurement "xu2" through "xu5," respectively. Specifically, each of the predicted values of measurement "Xu2" through "Xu5" at the measuring points "Ux2" through "Ux5" will be "xu2+Δxu2" through "xu5+Δxu5," respectively.

In a similar manner, each of the predicted values of measurement "Xl2" through "Xl5" and "Xr2" through "Xr5" at the measuring points "Lx2" through "Lx5" and "Rx2" through "Rx5" in the present work process are obtained, respectively, by adding each of the amounts of change "Δxl2" through "Δxl5" and "Δxr2" through "Δxr5" of the measured values to each of the measured values or predicted values of measurement "xl2" through "xl5" and "xr2" through "xr5," respectively. Specifically, each of the predicted values of measurement "Xl2" through "Xl5" and "Xr2" through "Xr5" at each of the measuring points "Lx2" through "Lx5" and "Rx2" through "Rx5" will be "xl2+Δxl2" through "xl5+Δxl5" and "xr2+Δxr2" through "xr5 +Δxr5," respectively.

Subsequently, based on the measured values "Xu1," "Xu6," "Xl1," "Xl6," "Xr1" and "Xr6" and the predicted values of measurement "Xu2" through "Xu5," "Xl2" through "Xl5" and "Xr2" through "Xr5" at the measuring points "Ux1" through "Ux6," "Lx1" through "Lx6" and "Rx1" through "Rx6" in the present work process, an amount of radial adjustment of each part of the casing 5 for the rotor 4 is specified, by using a method to specify an amount of adjustment that will be described hereinafter. Specifically, an amount of adjustment is specified, respectively, to shift the casing 5 vertically and horizontally in the radial direction of the rotor 4.

Figure 10:
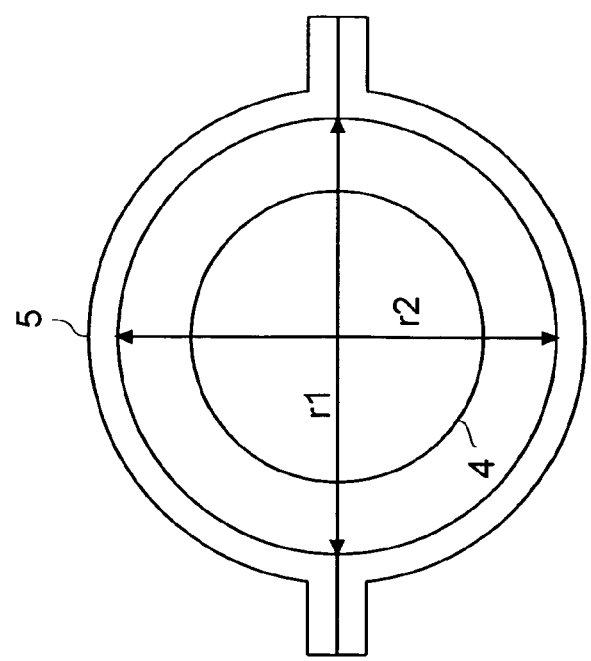
FIG. 10 is a diagram showing an example of an amount of radial adjustment of a casing of a gas turbine.

Now, as shown in the cross-sectional view in FIG. 10, the casing 5 is shifted upward vertically for "+y1" and leftward horizontally for "+x1." Specifically, an amount of vertically-upward adjustment is "+y1" and an amount of horizontally-leftward adjustment is "+x1." Here, the whole of the casing 5 is shifted leftward horizontally and upward vertically for "+x1" and "+y1," respectively. As a result, the clearance with the casing 5 on the left side of the rotor 4 is broadened for "x1;" but the clearance with the casing 5 on the right side of the rotor 4 is narrowed for "x1;" and the clearance with the casing 5 at the topside of the rotor 4 is broadened for "y1."

Consequently, "+x1" is added to the measured values "Xl1" and "Xl6" and the predicted values of measurement "Xl2" through "Xl5" at the measuring points "Lx1" through "Lx6" in the present work process, respectively; "−x1" is added to the measured values "Xr1" and "Xr6" and the predicted values of measurement "Xr2" through "Xr5" at the measuring points "Rx1" through "Rx6" in the present work process, respectively; and "+y1" is added to the measured values "Xu1" and "Xu6" and the predicted values of measurement "Xu2" through "Xu5" at the measuring points "Ux1" through "Ux6" in the present work process, respectively. Specifically, the predicted values of measurement "αu1" through "αu6," "αl1" through "αl6" and "αr1" through "αr6" at the measuring points "Ux1" through "Uc6," "Lx1" through "Lx6" and "Rx1" through "Rx6" after correction will be "Xu1+y1" through "Xu6+y1," "Xl1+x1" through "Xl6+x1" and "Xr1−x1" through "Xr6−x1," respectively.

As described hereinabove, when the predicted values of measurement "αu1" through "αu6," "αl1" through "αl6" and "αr1" through "αr6" at the measuring points "Ux1" through "Ux6," "Lx1" through "Lx6" and "Rx1" through "Rx6" are obtained after adjusting the position of the casing 5, the predicted values of measurement "αd1" through "αd6" at the measuring points "Dx1" through "Dx6" are obtained. The calculation method of the predicted values of measurement "αd1" through "αd6" at the measuring points "Dx1" through "Dx6" will be described hereinafter with the measuring location "x1" serving as a representative.

Figure 11:
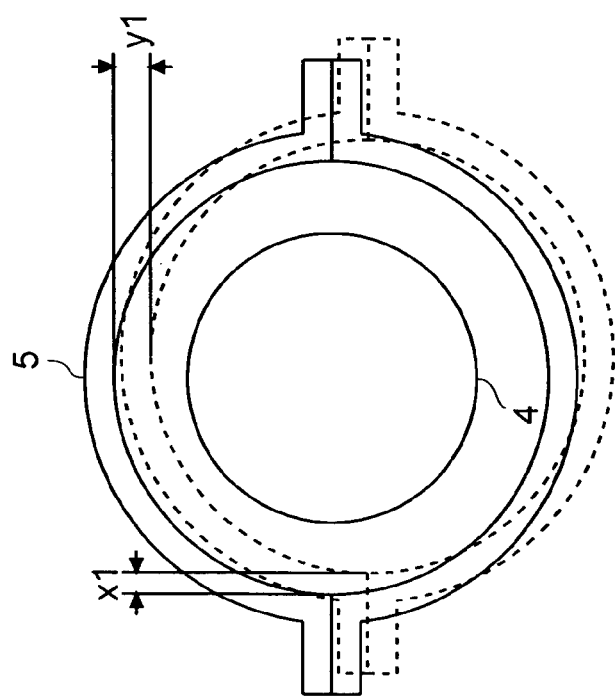
FIG. 11 is a diagram explaining a method to specify the amount of radial adjustment of a casing of a gas turbine.

As shown in a cross-sectional view in FIG. 11, when the lengths of the horizontal radius and the vertical radius of the casing 5 are "r1" and "r2," respectively, the difference between the addition of the clearances (αl1+αr1) with the casing 5 on each of the left side and the right side of the rotor 4 and the addition of the clearances (αu1+αd1) with the casing 5 on each of the topside and the bottom side of the rotor 4 becomes equal to the difference in length between the horizontal radius and the vertical radius of the casing 5 (r1−r2). Therefore, the predicted value of measurement "αd1" at the measuring point "Dx1" of the measuring location "x1" will be "αl1+αr1−αu1−(r1−r2)." In the same manner, the predicted values of measurement "αd2" through "αd6" at the measuring points "Dx2" through "Dx6" are obtained after positional adjustment of the casing 5, and the predicted values of measurement "αd2" through "αd6" will be "αl2+αr2−αu2−(r1−r2)" through "αl5+αr5−αu5−(r1−r2)," respectively.

In addition, when the measuring points "x1" and "x6" are at the ends of the casing 5, measurements can be taken at the measuring points "Dx1" and "Dx6," and the measured values "Xd1" and "Xd6" can be obtained, the predicated values of measurement "αd1" and "αd6" after adjusting the position of the casing 5 will be the values being obtained by adding an amount of adjustment for vertical shift of the casing 5 to the measured values "Xd1" and "Xd6." Specifically, when the casing 5 is shifted vertically upward for "+y1," the predicted values of measurement "αd1" and "αd6" at the measuring points "Dx1" and "Dx6," respectively, will be (Xd1−y1) and (Xd6−y1), respectively.

When the predicted values of measurement "Xu2" through "Xu5," "Xl2" through "Xl5" and "Xr2" through "Xr5" at the measuring points "Ux2" through "Ux5," "Lx2" through "Lx5" and "Rx2" through "Rx5" are obtained by correction as described hereinabove, the predicted values of measurement "Xu2" through "Xu5," "Xl2" through "Xl5" and "Xr2" through "Xr5" at the measuring points "Ux2" through "Ux5," "Lx2" through "Lx5" and "Rx2" through "Rx5" are transmitted to the data server 104 from the input terminal unit 101 with the measured values "Xu1," "Xu6," "Xl1," "Xl6," "Xr1" and "Xr6" at the measuring points "Ux1," "Ux6," "Lx1," "Lx6," "Rx1" and "Rx6" and stored in the database 103. In addition, in the similar manner, when the predicted values of measurement "αu1" through "αu6," "αd2" through "αd6," "αl1" through "αl6," and "αr1" through "αr6" at the measuring points "Ux1" through "Ux6," "Dx1" through "Dx6," "Lx1" through "Lx6" and "Rx1" through "Rx6" are obtained after adjusting the position of the casing 5, the predicted values of measurement "αu1" through "αu6," "αd2" through "αd6," "αl1" through "αl6," and "αr1" through "αr6" at the measuring points "Ux1" through "Ux6," "Dx1" through "Dx6," "Lx1" through "Lx6" and "Rx1" through "Rx6" will be transmitted to the data server 104 from the input terminal unit 101 and stored in the database 103.

Therefore, as for the measuring points where measurements can be taken only during final assembly of the rotor 4, when the outer casing of the casing 5 is installed, predicted values of measurement are obtained on the basis of correction in accordance with horizontal expansion of the radius when the inner casing of the casing 5 is installed, the amounts of change when the casing 5 is assembled and the amounts of adjustment of the casing 5. In addition, as for the measuring points where measurements can be taken when the inner casing of the casing 5 is finally assembled, predicted values of measurement are obtained on the basis of the amounts of change when the casing 5 is assembled and the amounts of adjustment of the casing 5.

When the predicted values of measurement are specified in the manner as mentioned hereinabove by correcting the data of radial measurements, after final assembly of the compressor inner casing 51 in STEP 9, first, predicted values of measurement at the measuring points "Lc5" and "Rc5" are obtained on the basis of the measured values at the measuring points "Lc4" through "Lc6" and "Rc4" through "Rc6" that are obtained by measurements in STEP 3 and the measured values at the measuring points "Lc4," "Rc4," "Lc6" and "Rc6" that are obtained by measurements in STEP 9, and the predicted value of measurement at the measuring point "Uc5" is obtained on the basis of the measured values at the measuring points "Uc4" through "Uc6" that are obtained by measurements in STEP 8 and the measured values at the measuring points "Uc4" and "Uc6" that are obtained by measurements in STEP 9.

Then, in STEP 10, when the position of the compressor inner casing 51 is adjusted on the basis of the measured values or the predicted values of measurement at the measuring points "Uc4" through "Uc6," "Dc4," "Dc6," "Lc4" through "Lc6" and "Rc4" through "Rc6," respectively, the measured values or the predicted values of measurement at the measuring points "Uc4" through "Uc6," "Dc4," "Dc6," "Lc4" through "Lc6" and "Rc4" through "Rc6," respectively, will be changed in accordance with the amounts of adjustment. When the predicted values of measurement at the measuring points "Uc4" through "Uc6," "Dc4," "Dc6," "Lc4" through "Lc6" and "Rc4" through "Rc6," respectively, are obtained, the predicted value of measurement at the measuring point "Dc5" will be obtained on the basis of the predicted values of measurement at the measuring points "Uc5," "Lc5" and "Rc5" and the lengths of the vertical radius and the horizontal radius of the compressor inner casing 51.

Additionally, when the compressor outer casing 52 is finally assembled in STEP 12, the predicted values of measurement at the measuring points "Lc2" through "Lc5" and "Rc2" through "Rc5 are obtained on the basis of the measured values at the measuring points "Lc1" through "Lc6" and "Rc1" through "Rc6" that are obtained by measurements in STEP 3 and the measured values at the measuring points "Lc1," "Rc1," "Lc6" and "Rc6" that are obtained by measurements in STEP 12, and the predicted values of measurement at the measuring points "Uc2" through "Uc5" are obtained on the basis of the measured values at the measuring points "Uc1" through "Uc6" that are obtained by measurements in STEP 11 and the measured values at the measuring points "Uc1" and "Uc6" that are obtained by measurements in STEP 12.

Then, when the positions of the compressor inner casing 51 and the compressor outer casing 52 are adjusted on the basis of the measured values or the predicted values of measurement at the measuring points "Uc1" through "Uc6," "Dc1," "Dc6," "Lc1" through "Lc6" and "Rc1" through "Rc6," respectively, in STEP 13, the measured values or predicted values of measurement at the measuring points "Uc1" through "Uc6," "Dc1," "Dc6," "Lc1" through "Lc6" and "Rc1" through "Rc6," respectively, will be changed in accordance with the amounts of adjustment. Additionally, the predicted values of measurement at the measuring points "Dc2" through "Dc5" are obtained on the basis of the predicted values of measurement at the measuring points "Uc2" through "Uc5," "Lc2" through "Lc5" and "Rc2" through "Rc5" and the lengths of the vertical radius and the horizontal radius of the compressor inner casing 51 and the compressor outer casing 52.

Moreover, when the turbine outer casing 55 is temporarily assembled in STEP 18, first, the predicted values of measurement at the measuring points "Lc2" through "Lc5," Rc2" through "Rc5," "Rt2," "Rt3," "Lt2" and "Lt3" are obtained on the basis of the measured values at the measuring points "Lc1" through "Lc6," "Rc1" through "Rc6," "Lt1" through "Lt4" and "Rt1" through "Rt4" that are obtained in STEP 3 and the measured values at the measuring points "Lc1", "Rc1," "Lc6," "Rc6," "Lt1," "Rt1," "Lt4" and "Rt4" that are obtained in STEP 18. Here, the predicted values of measurement at the measuring points "Uc2" through "Uc5" are obtained on the basis of the measured values at the measuring points "Uc1" through "Uc6" that are obtained in STEP 11 and the measured values at the measuring points "Uc1" and "Uc6" that are obtained in STEP 18. Moreover, the predicted values of measurement at the measuring points "Ut2" and "Ut3" are obtained on the basis of the measured values at the measuring points "Ut1" through "Ut4" that are obtained in STEP 16 and the measured values at the measuring points "Ut1" and "Ut4" that are obtained in STEP 18.

Then, in STEP 19, when the positions of the compressor inner casing 51, the turbine inner casing 53 and the seal housing 54 are adjusted based on the measured values or predicted values of measurement at the measuring points "Uc1" through "Uc6," "Dc1," "Dc6," "Lc1" through "Lc6," "Rc1" through "Rc6," "Ut1" through "Ut4," "Dt1," "Dt4," "Lt1" through "Lt4" and "Rt1" through "Rt4," respectively, the measured values or predicted values of measurement at the measuring points "Uc1" through "Uc6," "Dc1," "Dc6," "Lc1" through "Lc6," "Rc1" through "Rc6," "Ut1" through "Ut4," "Dt1," "Dt4," "Lt1" through "Lt4" and "Rt1" through "Rt4," respectively, will be changed in accordance with the amounts of adjustment. In addition, the predicted values of measurement at the measuring points "Dc2" through "Dc5," "Dt2" and "Dt3" are obtained on the basis of the predicted values of measurement at the measuring points "Uc2" through "Uc5," "Lc2" through "Lc5," "Rc2" through "Rc5," "Ut2," "Ut3," "Lt2," "Lt3," "Rt2" and "Rt3 " and the lengths of the vertical radius and the horizontal radius of the compressor inner casing 51, compressor outer casing 52 and the seal housing 54.

Moreover, when the turbine outer casing 55 is finally assembled in STEP 21, first, the predicted values of measurement at the measuring points "Lc2" through "Lc6," "Rc2" through "Rc6," "Lt1" through "Lt3" and "Rt1" through "Rt3" are obtained on the basis of the measured values at the measuring points "Lc1" through "Lc6," "Rc1" through "Rc6," "Lt1" through "Lt4" and "Rt1" through "Rt4" that are obtained by measurements in STEP 3 and the measured values at the measuring points "Lc1," "Rc1," "Lt4" and "Rt4" that are obtained by measurements in STEP 21. The predicted values of measurement at the measuring points "Uc2" through "Uc6" and "Ut1" through "Ut3" are obtained on the basis of the predicted values of measurement at the measuring points "Uc1" through "Uc6" and "Ut1" through "Ut4" that are obtained in STEP 19 and the measured values at the measuring points "Uc1" and "Ut4" that are obtained by measurements in STEP 21.

The predicted values of measurement that are obtained by the input terminal unit 101 in such a manner as mentioned hereinabove are displayed on the input terminal unit 101 together with the measured values that are entered by the worker. In addition, as a result of obtaining the predicted values of measurement, the amounts of adjustment are calculated to shift each part of the casing against the radial direction of the rotor 4 in accordance with the measured value and the predicted value of measurement at each measuring point in a work process in which the position of each part of the casing 5 is adjusted. Moreover, as described hereinabove, the predicted values of measurement being obtained in each work process are provided to the data server 104 through the network 105, together with the measured values being supplied to the input terminal unit 101, and stored in the database 103 as the data of the work process where the measurements are taken.

(Correction of Data of Axial Measurements) Additionally, when the measured values being obtained by the worker's measurements are supplied to the input terminal unit 101, the data are corrected based on the measured values being entered. Here not only correction of the data of the radial measurements of the rotor 4 but also the data of the axial measurements of the rotor 4 are corrected. Measurements on all the axial measuring points "r0" through "rn" of the rotor 4 are taken when the rotor 4 is finally assembled in STEP 3. Then, when measurements are taken in each subsequent work process, measurement is only taken at the measuring point "r0" serving as the reference position; and by correcting on the basis of the measured value at this measuring point "r0," the predicted values of measurement at the measuring points "r1" through "rn," respectively, are obtained.

First, measurements of the axial misalignment of the rotor 4 during final assembly of the rotor 4 in STEP 3 will be described hereinafter. The axial misalignment of the rotor 4 at the measuring points "r0" through "rn," respectively, are obtained in the following manner: The axial misalignment of the rotor 4 at the measuring point "r0" serving as the reference position is obtained by measuring the distance between the flange being installed to the upstream-side end of the rotor 4 and the upstream-side outer end surface of the thrust bearing 50; and the axial misalignment of the rotor 4 at the measuring points "r1" through "rn" is obtained by measuring the distance between the thrust collar 40 and the inner end surface of the thrust bearing 50, the distance between the end surface of the rotating blade 1a and the end surface of the stationary vane 1b, the distance between the end surface of the rotating blade 3a and the end surface of the stationary vane 3b, the distance between the sealing member being installed to the casing 5 and the sealing member location on the end surface of the rotor 4, and the like.

Here, at each of the measuring points "r0" through "rn" of the rotor 4, one or both of the upstream or the downstream distances are measured in accordance with the relative position of an object (end surfaces of the stationary vanes 1b and 3b, a sealing member, the inner end surface of the thrust bearing 50, the end of the compressor outer casing 52 and the like) of the casing 5 for which the distance to the rotor 4 is measured in order to obtain the axial misalignment. Specifically, when the positional relation between the measuring point "rk" ("k" is an integer number of "1≦k≦n.") of the rotor 4 and the measuring object "Z" in the casing 5 is such as the measuring object "Z" is on the upstream side of the measuring point "rk" as shown in FIG. 12A, the distance "zk" to the measuring object "Z" is measured as the upstream-side distance of the measuring point "rk." And, when the positional relation between the measuring point "rk" of the rotor 4 and the measuring object "Z" in the casing 5 is such as the measuring object "Z" is on the downstream side of the measuring point "rk" as shown in FIG. 12B, the distance "zk" to the measuring object "Z" is measured as the downstream-side distance of the measuring point "rk." In addition, at the measuring point "r0" of the rotor 4 serving as the reference position, the downstream-side distance is measured because the measuring object exists on the downstream side.

When the upstream-side or the downstream-side distances "z0" through "zn" are measured as the axial misalignment at the measuring points "r0" through "rn," respectively, at the time of final assembly of the rotor 4 in STEP 3, the upstream-side or the downstream-side distances "z0" through "zn" at each of the measuring points "r0" through "rn" are supplied to the input terminal unit 101 by the worker. Then, the upstream-side or the downstream-side distances "z0" through "zn" at the measuring points "r0" through "rn" are temporarily recorded in a recording medium of the input terminal unit 101, and at the same time, provided to the data server 104 through the network 105 so as to be stored in the database 103 as the data at the time of the final assembly of the rotor 4.

Subsequently, when the axial misalignment of the rotor 4 is measured in each work process, the downstream-side distance "z" to the upstream-side outer end surface of the thrust bearing 50 is measured at the measuring point "r0." Then, the difference "Δz" (=z−z0) from the downstream-side distance "z0" being measured at the measuring point "r0" in STEP 3 is obtained. And then, the difference "Δz" from the downstream-side distance "z0" at the measuring point "r0" that is obtained is subtracted from or added to the upstream-side or the downstream-side distances "z1" through "zn" at the measuring points "r1" through "rn," repectively, that are measured in STEP 3. Specifically, when the upstream-side distance is measured at the measuring point "rk," the distance after correction will be the predicted value of measurement "zk−Δz;" and when the downstream-side distance is measured at the measuring point "rk," the distance after correction will be the predicted value of measurement "zk+Δz."

The predicted values of measurement at the measuring points "r1" through "rn" that are obtained by the input terminal unit 101 are displayed on the input terminal unit 101 with the measured value at the measuring point "r0" that is entered by the worker. In addition, in a work process in which the position of each part of the casing 5 is adjusted, by obtaining the predicted values of measurement, the amounts of adjustment are calculated to shift each part of the casing against the axial direction of the rotor 4 in accordance with the measured value and the predicted value of measurement at each measuring point. Moreover, as described hereinabove, together with the measured values being supplied to the input terminal unit 101, the predicted values of measurement being obtained in each work process are provided to the data server 104 through the network 105, and then stored in the database 103 as the data of the work process where the measurements are taken.

(Setting of the Amounts of the Radial Adjustment)

As described hereinabove, after the clearance between each measuring point of the rotor 4 and the casing 5 is obtained in each work process of the assembly of the casing 5 by correcting the data of the radial measurements based on the measured values that are obtained by the worker's measurements, the amounts of adjustment are obtained in order to adjust the position of the casing 5 in the radial direction of the rotor 4 on the basis of comparison of the measured value or predicted value of measurement of the clearance at each measuring point with the designed value. In addition, the designed value of the clearance at each measuring point of the rotor 4 is entered by the designer through the input terminal unit 102 and stored in the database 103. Then, by communication between the input terminal unit 101 and the data server 104, the designed values being stored in the database 103 are retrieved and transmitted to the input terminal unit 101.

Specifically, the amounts of adjustment to shift the casing 5 horizontally in the radial direction of the rotor 4 are set by obtaining the mean value of the difference between the measured values or predicted values of measurement at each measuring point on the left side and the right side of the rotor 4 in each measuring location and the designed clearances with the casing 5 on the left side and the right side of the rotor 4 and minimizing the mean value. In addition, the amounts of adjustment to shift the casing 5 vertically in the radial direction of the rotor 4 is set by obtaining the mean value of the difference between the measured values or predicted values of measurement at each measuring point on the topside and the bottom side of the rotor 4 in each measuring location and the designed clearances with the casing 5 on the topside and the bottom side of the rotor 4 and minimizing the mean value.

In consequence, for example, when the measuring points of the rotor 4 are six points "x1" through "x6" and the measured values "Xu1," "Xu6," "Xl1," "Xl6," "Xr1" and "Xr6" are obtained at the measuring points "Ux1," "Ux6," "Lx1," "Lx6," "Rx1" and "Rx6," respectively, the predicted values of measurement "Xu2" through "Xu5," "Xl2" through "Xl5" and "Xr2" through "Xr5" at the measuring points "Ux2" through "Ux5," "Lx2" through "Lx5" and "Rx2" through "Rx5," respectively, are obtained by above-mentioned correction. Then, the predicted values of measurement "Xd1" through "Xd6" on the bottom side positions "Dx1" through "Dx6" in the measuring locations "x1" through "x6" of the rotor 4 are obtained on the basis of the measured values or predicted values of measurement "Xu1" through "Xu6" at the measuring points "Ux1" through "Ux6," respectively, the measured values or predicted values of measurement "Xl1" through "Xl6" at the measuring points "Lx1" through "Lx6," respectively, and the measured values or predicted values of measurement "Xr1" through "Xr6" at the measuring points "Rx1" through "Rx6," respectively.

Specifically, when the measured values or predicted values of measurement "Xum," "Xlm" and "Xrm" on each of the topside, the left side and the right side in the measuring location "xm" ("m" is an integer number of "1≦m≦6.") of the rotor 4 are obtained, the predicted value of measurement "Xdm" on the bottom side in the measuring location "xm" of the rotor 4 is obtained on the basis of the measured values or predicted values of measurement "Xum," "Xlm" and "Xrm" and the lengths "ram" and "rbm" of the horizontal radius and the vertical radius of the casing 5 in the measuring location "xm." Specifically, the predicted value of measurement "Xdm" at the bottom side position "Dxm" in the measuring location "xm" of the rotor 4 is "Xlm+Xrm−Xum−(ram−rbm)." The predicted values of measurement "Xd1" through "Xd6" at the bottom side positions "Dx1" through "Dx6" in the measuring locations "x1" through "x6" of the rotor 4 are obtained, respectively, in the manner as described hereinabove.

In the measuring locations "x1" through "x6" of the rotor 4 being stored in the database 103, the designed values at the topside measuring points "Ux1" through "Ux6," respectively, are "Xup1" through "Xup6;" the designed values at the bottom side measuring points "Dx1" through "Dx6," respectively, are "Xdp1" through "Xdp6;" the designed values at the left-side measuring points "Lx1" through "Lx6," respectively, are "Xlp1" through "Xlp6;" and the designed values at the right-side measuring points "Rx1" through "Rx6," respectively, are "Xrp1" through "Xrp6." In addition, the tolerance of the designed values at the topside measuring points "Ux1" through "Ux6," respectively, is between "±Δup1" and "±Δup6;" the tolerance of the designed values at the bottom side measuring points "Dx1" through "Dx6," respectively, is between "±Δdp1" and "±Δdp6;" the tolerance of the designed values at the left-side measuring points "Lx1" through "Lx6," respectively, is between "±Δlp1" and "±Δlp6;" and the tolerance of the designed values at the right-side measuring points "Rx1" through "Rx6," respectively, is between "±Δrp1" and "±Δrp6."

Here, first, the designed values "Xup1" through "Xup6," "Xdp1" through "Xdp6," "Xlp1" through "Xlp6" and "Xrp1" through "Xrp6" are transmitted to the input terminal unit 101 from the data server 104. As a result, in the input terminal unit 101, the measured values or predicted values of measurement "Xu1" through "Xu6," "Xd1" through "Xd6," "Xl1" through "Xl6" and "Xr1" through "Xr6" on each of the topside, the bottom side, the left side and the right side of the measuring points "x1" through "x6" of the rotor 4, respectively, are compared with the designed values "Xup1" through "Xup6," "Xdp1" through "Xdp6," "Xlp1" through "Xlp6" and "Xrp1" through "Xrp6," respectively. Then, based on the comparison results of the measured values or predicted values of measurement with the designed values, the amounts of adjustment are set to shift the casing 5 vertically and horizontally, respectively.

As for the amounts of the vertical adjustment of the casing 5, first, the difference "Dum" (=Xum−Xupm) between the measured value or predicted value of measurement "Xum" and the designed value "Xupm" at the topside measuring point "Uxm" of the rotor 4 and the difference "Ddm" (=Xdm−Xdpm) between the measured value or predicted value of measurement "Xdm" and the designed value "Xdpm" at the bottom side measuring point "Dxm" of the rotor 4 are obtained in the measuring location "xm" of the rotor 4. Specifically, in the measuring locations "x1" through "x6," respectively, the differences "Du1" through "Du6" between the measured values or predicted values of measurement and the designed values at the topside measuring points "Ux1" through "Ux6," respectively, and the differences "Dd1" through "Dd6" between the measured values or predicted values of measurement and the designed values are obtained at the bottom side measuring points "Dx1" through "Dx6," respectively.

Then, the mean value "Duav" of the differences between the measured values or predicted values of measurement and the designed values at the topside measuring points is obtained by the differences "Du1" through "Du6" between the measured values or predicted values of measurement and the designed values at the topside measuring points "Ux1" through "Ux6," respectively; and at the same time, the mean value "Ddav" of the differences between the measured values or predicted values and the designed values of measurement at the bottom side measuring points is obtained by the differences "Dd1" through "Dd6" between the measured values or predicted values of measurement and the designed values at the bottom side measuring points "Dx1" through "Dx6," respectively. Optimum amounts of horizontal adjustment of the casing 5 are set based on the mean values "Duav" and "Ddav" of the differences at the topside measuring points and the bottom side measuring points from the designed values, respectively. Here, when the mean value "Duav" of the differences from the designed values at the topside measuring points increases, an amount of adjustment is set so as to have the casing 5 shift vertically to the bottom side; and when the mean value "Ddav" of the differences from the designed values at the bottom side measuring points increases, an amount of adjustment is set so as to have the casing 5 shift vertically to the topside.

In the similar manner, as for the amounts of the horizontal adjustment of the casing 5, first, the difference "Dlm" (=Xlm−Xlpm) between the measured value or predicted value of measurement "Xlm" and the designed value "Xlpm" at the left-side measuring point "Lxm" of the rotor 4 and the difference "Drm" (=Xrm−Xrpm) between the measured value or predicted value of measurement "Xrm" and the designed value "Xrpm" at the right-side measuring point "Rxm" of the rotor 4 are obtained in the measuring location "xm" of the rotor 4. Specifically, in the measuring locations "x1" through "x6," respectively, the differences "Dl1" through "Dl6" between the measured values or predicted values of measurement and the designed values at the left-side measuring points "Lx1" through "Lx6," respectively, and the differences "Dr1" through "Dr6" between the measured values or predicted values of measurement and the designed values at the right-side measuring points "Rx1" through "Rx6," respectively, are obtained.

Then, the mean value "Dlav" of the differences between the measured values or predicted values of measurement and the designed values at the left-side measuring points is obtained by the differences "Dl1" through "Dl6" between the measured values or predicted values of measurement and the designed values at the left-side measuring points "Lx1" through "Lx6," respectively; and at the same time, the mean value "Drav" of the differences between the measured values or predicted values and the designed values of measurement at the right-side measuring points is obtained by the differences "Dr1" through "Dr6" between the measured values or predicted values of measurement and the designed values at the right-side measuring points "Rx1" through "Rx6," respectively. Optimum amounts of horizontal adjustment of the casing 5 are set based on the mean values "Dlav" and "Drav" of the differences at the left-side measuring points and the right-side measuring points from the designed values, respectively. Here, when the mean value "Dlav" of the differences from the designed value at the left-side measuring points increases, an amount of adjustment is set so as to have the casing 5 shift horizontally to the right side; and when the mean value "Drav" of the differences from the designed value at the right-side measuring points increases, an amount of adjustment is set so as to have the casing 5 shift horizontally to the left side.

After the position of the casing 5 is adjusted on the basis of the amounts of adjustment of the position of the casing 5 that are set in such a manner as described hereinabove, the radial clearances between the casing 5 and the rotor 4 are measured again after adjustment, when the clearances at the measuring points where measurement is impossible are corrected on the basis of the measured values that are obtained by measurements, so as to obtain the predicted values of measurement. Then, it is confirmed whether or not the measured values or predicted values of measurement on each of the topside, the bottom side, the left side and the right side of the measuring locations "x1" through "x6" of the rotor 4 that are confirmed after adjustment of the casing 5 are within the following tolerance ranges of the designed values; "Xup1±Δup1," "Xup2±Δup2," "Xup3±Δup3," "Xup4±Δup4," "Xup5 ±Δup5," and "Xup6±Δup6," for the values at the topside; "Xdp1±Δdp1," "Xdp2±Δdp2," "Xdp3±Δdp3," "Xdp4±Δdp4," "Xdp5±Δdp5," and "Xdp6±Δdp6," for the values at the bottom side; "Xlp1±Δlp1," "Xlp2±Δlp2," "Xlp3±Δlp3," "Xlp4±Δlp4," "Xlp5±Δlp5," and "Xlp6±Δlp6" for the values at the left side; "Xrp1±Δrp1," "Xrp2±Δrp2," "Xrp3±Δrp3," "Xrp4 ±Δrp4," "Xrp5±Δrp5," and "Xrp6±Δrp6" for the values at the right side. Wherein, when at least one of the measuring points of the rotor 4 that are confirmed after adjustment of the casing 5 is out of the tolerance of the designed value, the amounts of adjustment of the position of the casing 5 are set again, and the position of the casing 5 is re-adjusted. In this manner, the position of the casing 5 is adjusted in order that the radial clearances between the rotor 4 and the casing 5 will be optimum.

(Setting of the Amounts of the Axial Adjustment)

In addition, when the upstream-side or the downstream-side distance from a measuring object of the casing 5 at each measuring point of the rotor 4 is obtained in each work process of the assembly of the casing 5 by correcting the data of the axial measurements based on the measured values that are obtained by the worker's measurements, the amounts of adjustment are obtained in order to adjust the rotor 4 or the casing 5 in the axial direction on the basis of comparison of the measured value or predicted value of measurement of the distance at each measuring point with the designed value at the same point. In addition, the designed value of the upstream-side or the downstream-side distance from the measuring object of the casing 5 at each measuring point of the rotor 4 is entered by the designer through the input terminal unit 102 and stored in the database 103. Then, by communication between the input terminal unit 101 and the data server 104, the designed values being stored in the database 103 are retrieved and transmitted to the input terminal unit 101.

Specifically, after the axial misalignment at each measuring point is obtained by obtaining the difference between the measured value or predicted value of measurement and the designed value at each measuring point of the rotor 4, the mean value is obtained by weighting addition to the axial misalignment at each measuring point. Then the amounts of adjustment to shift the rotor 4 or the casing 5 in the radial direction of the rotor 4 are set on the basis of the mean value that is obtained. At this time, the mean value of the upstream-side distances to a measuring object of the casing 5 at the measuring points of the rotor 4 and the mean value of the downstream-side distances to a measuring object of the casing 5 at the measuring points of the rotor 4 are obtained, respectively. Then, the amounts of adjustment to shift the rotor 4 or the casing 5 in the axial direction of the rotor 4 are set on the basis of the mean value of the measured values or predicted values of measurement of the upstream-side distances and the downstream-side distances, respectively.

In consequence, for example, the measuring points of the rotor 4 are ten points "r0" through "r9;" the downstream-distances from the measuring object of the casing 5 are obtained at the measuring points "r0," "r2," "r4," "r6" and "r8;" and the upstream-side distances from the measuring object of the casing 5 are obtained at the measuring points "r1," "r3," "r5," "r7" and "r9." Wherein, first, the differences between the measured values or predicted values of measurement "z0" through "z9" and the designed values "zp0" through "zp9" at the measuring points "r0" through "r9," respectively, are obtained; and the axial misalignments Δz0 (=z0−zp0) through Δz9 (=z9−zp9) are obtained at the measuring points "r0" through "r9," respectively.

In addition, when the parts at the measuring points "r0," "r7" through "r9" of the rotor 4 are locations where contact with the casing 5 is not allowable or where disturbance factors are a few in taking measurements, the weighting factor being supplied in performing the weighting addition is increased. Specifically, the weighting factor "a1" being supplied to the measured values or predicted values of measurement "z1" through "z6" at the measuring points "r1" through "r6," respectively, are smaller than the weighting factor "a2" being supplied to the measured values or predicted values of measurement "z0," "z7" through "z9" at the measuring points "r0," "r7" through "r9," respectively.

Then by weighting addition of the axial misalignments to the downstream side "Δz0," "Δz2", "Δz4," "Δz6" and "Δz8" at the measuring points "r0," "r2," "r4," "r6" and "r8," the mean value "$\Delta zav1$" of the axial misalignments to the downstream side is obtained. Specifically, the mean value "$\Delta zav1$" of the axial misalignments to the downstream side at each measuring point is "$(\Delta z2+\Delta z4+\Delta z6)\times a2+(\Delta z0+\Delta z8)\times a1)/(3\times a\ 2+2\times a1)$." Additionally, by weighting addition of the axial misalignments to the upstream side "$\Delta z1$," "$\Delta z3$," "$\Delta z5$," "$\Delta z7$" and "$\Delta z9$" at the measuring points "r1," "r3," "r5," "r7" and "r9," the mean value "$\Delta zav2$" of the axial misalignments to the upstream side is obtained. Specifically, the mean value "$\Delta zav2$" of the axial misalignments to the upstream side is "$(\Delta z1+\Delta z3+\Delta z5)\times a1+(\Delta z7+\Delta z9)\times a2)/(3\times a1+2\times a2)$."

The amounts of adjustment to shift the rotor 4 in the axial direction of the rotor 4 are set by the mean values "$\Delta zav1$" and "$\Delta zav2$" of the axial misalignments to the downstream side and the upstream side that are obtained in such a manner as described hereinabove. Here, the amount of adjustment to shift the rotor 4 to the downstream side is "$(\Delta zav1-\Delta zav2)/2$." In addition, the amounts of adjustment to shift the rotor 4 to the downstream side are obtained in the work processes subsequent to the final assembly of the rotor 4.

Then, when the amounts of adjustment to shift the rotor 4 are obtained, the axial misalignment at each measuring point after adjustment is obtained, which is confirmed to be whether within the tolerance or not. At this time, when the axial misalignment after adjustment is out of the tolerance at at least one of the measuring points "r0" through "r9," the amounts of adjustment to shift the rotor 4 or the casing 5 in the axial direction of the rotor 4 are set so that the axial misalignments at the measuring points where the axial misalignments are out of the tolerance will be within the tolerance. Being based on the amounts of adjustment that are set in such a manner as described hereinabove, the position of the rotor 4 or the casing 5 is shifted axially so as to achieve the optimum positional relation. In addition, in the above assembly work, measurement of the axial misalignments and setting of the amounts of adjustment are carried out in a plurality of work processes subsequent to the final assembly of the rotor 4, but may be carried out only in the work process of the final assembly of the rotor 4 and at the time when the casing 5 is completed.

Moreover, as a method to confirm the amount of the misalignment, in order to make it easy for the workers to understand, the divisions in accordance with each axial clearance may be indicated by color coding in several levels depending on the degree of deviation from the designed misalignment. Moreover, the amounts of adjustment may be adjusted by manual entry while looking at the diagram being indicated by the color coding so that the color of each division will be closer to the designed value, and the results of adjustments may be displayed.

In accordance with a system for assembly of a rotating machinery being provided with an input terminal unit 101 having such an application as described hereinabove, by operating the input terminal unit 101, a worker can easily understand the measuring locations in each work process, and also the input terminal unit 101 can calculate for correction of data for locations where measurement is impossible. In addition, because the measured values and the predicted values of measurement being entered with the input terminal unit 101 are stored in the database 103, respectively, the data in each work process of the assembly work of a gas turbine can be confirmed by communication with the data server 104 by the other terminal unit 106 than the input terminal unit 101 being linked by the network 105. Moreover, in the input terminal unit 101, the data can be output after rearrangement in necessary format or can be output as forms from the database 103 where the measured values or predicted values of measurement at the measuring points are recorded and stored for each work process of the assembly work.

As described hereinabove, in the present embodiment, the measured values and the predicted values of measurement being entered by the input terminal unit 101 and the designed values being entered by the input terminal unit 102 in the above-mentioned manner are stored in the database 103 and can be browsed by communication of the input terminal units 101 and 102 and the output terminal unit 106 with the data server 104 by way of the network 105, respectively. At this time, the input terminal units 101 and 102 are provided with a local database, and the database 104 stores the latest data in the database 103 by comparing the updates being uploaded from the input terminal units 101 and 102 with the data in the database 103. Specifically, a difference database where new data are always stored in the database 103 may be established by the database 103 and the dataserver 104.

In addition, when the difference database is established by the database 103 and the data server 104, a message having data to be entered attached thereto may be sent from a terminal unit other than the input terminal units 101 and 102 by way of the network 105. At this time, by having the data server 104 compare the data being attached to the message with the data being stored in the database 103, new data are always stored in the database 103. Furthermore, with the data server 104 serving as a web server, each of the input terminal units 101 and 102 and the output terminal unit 106 may perform data entry into the database 103 and browsing of data stored in the database 103 by using an application such as a web browser and the like.

The system for assembly of a rotating machine in accordance with the present invention is applicable as a system supporting the assembly work of a large rotating machine such as a gas turbine, a steam turbine, a pump and the like.

What is claimed is:

1. A system for assembly of a rotating machine comprises:
   an input terminal unit that in performing assembly work of a rotating machine being provided with a rotor being rotary driven and a casing covering and supporting the rotor, instructs a first measuring point necessary for measurements at measuring points of the rotating machine for each work process of the assembly work, and at the same time, determines whether a measured value being entered is within a permissible design range or not when measured value at the first measuring point being instructed is entered; and
   a database recording measured values at the measuring points being entered by the input terminal unit for each work process of the assembly work.

2. A system for assembly of a rotating machine as described in claim 1:
   wherein, the input terminal unit specifies amounts of adjustment to adjust position of the rotor or the casing based on measured values at the measuring points.

3. A system for assembly of a rotating machine as described in claim 2:
   wherein, the input terminal unit specifies the amounts of adjustment of position of the rotor or the casing based on mean value of differences between measured values and designed values at the measuring points.

4. A system for assembly of a rotating machine as described in claim 3:
   wherein, mean value of differences between measured values and design values is obtained by weighting addition being provided with a weighting coefficient based on positions of the measuring points.

5. A system for assembly of a rotating machine as described in claim 1:
- wherein, the input terminal unit estimates a predicted value of measurement at a second measuring point other than the first measuring point of measuring points of the rotating machine, based on measured values at the first measuring point being obtained by measurements and entered in present work process of the assembly work and measured values at the first and the second measuring points being obtained by measurements and entered in previous work process to present work process of the assembly work; and
- determines whether predicted value of measurement at the second measuring point is within design tolerance or not.

6. A system for assembly of a rotating machine as described in claim 5:
- wherein, the input terminal unit specifies amounts of adjustment to adjust position of the rotor or the casing based on measured values or predicted values of measurement at the measuring points.

7. A system for assembly of a rotating machine as described in claim 6:
- wherein, the input terminal unit specifies the amounts of adjustment of position of the rotor or the casing, based on mean value of differences between measured values or predicted values of measurement and designed values at the measuring points.

8. A system for assembly of a rotating machine as described in claim 7:
- wherein, mean value of differences between measured values or predicted values of measurement and designed values is obtained by a weighting addition being provided with a weighting coefficient based on positions of the measuring points.

9. A system for assembly of a rotating machine as described in claim 1:
- wherein, in each work process of the assembly work to install an upper half of the casing after installing the rotor to a lower half of the casing, radial and axial clearances between the rotor and the casing are measured at each of the measuring points being specified axially of the rotating machine,; and
- the input terminal unit displays and instructs as the first measuring point, of the measuring points being specified for the rotating machine, a measuring point where radial or axial clearances between the rotor and the casing can be measured.

10. A system for assembly of a rotating machine as described in claim 9:
- wherein, the input terminal unit estimates predicted value of measurement at a second measuring point of the measuring points being specified for the rotating machine, where radial or axial clearances between the rotor and the casing cannot be measured, based on measured value at the first measuring point being obtained by measurement and entered in present work process of the assembly work and measured values at the first and the second measuring points being obtained by measurements and entered in previous work process to present work process of the assembly work.

11. A system for assembly of a rotating machine as described in claim 1:
- wherein, the input terminal unit outputs data being obtained by having measured values at the measuring points recorded and stored for each work process of the assembly work after rearranging obtained data in a necessary format.

* * * * *